United States Patent
Sakurabu et al.

(10) Patent No.: US 11,457,136 B2
(45) Date of Patent: Sep. 27, 2022

(54) IMAGING ELEMENT, IMAGING APPARATUS, IMAGE DATA PROCESSING METHOD, AND PROGRAM

(71) Applicant: FUJIFILM CORPORATION, Tokyo (JP)

(72) Inventors: Hitoshi Sakurabu, Saitama (JP); Ryo Hasegawa, Saitama (JP); Tomoyuki Kawai, Saitama (JP); Makoto Kobayashi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/351,271

(22) Filed: Jun. 18, 2021

(65) Prior Publication Data

US 2021/0314483 A1 Oct. 7, 2021

Related U.S. Application Data

(63) Continuation of application No. PCT/JP2019/044511, filed on Nov. 13, 2019.

(30) Foreign Application Priority Data

Dec. 27, 2018 (JP) .............................. JP2018-245749

(51) Int. Cl.
*H04N 5/232* (2006.01)
*H04N 5/235* (2006.01)
*G03B 13/36* (2021.01)

(52) U.S. Cl.
CPC ......... *H04N 5/23212* (2013.01); *G03B 13/36* (2013.01); *H04N 5/2353* (2013.01); *H04N 5/2357* (2013.01)

(58) Field of Classification Search
CPC ............. H04N 5/23212; H04N 5/2353; H04N 5/2357; H04N 5/2254; H04N 5/232122;
(Continued)

(56) References Cited

U.S. PATENT DOCUMENTS 10,116,856 B2 * 10/2018 Kikuchi ........... H04N 5/232935
2013/0329090 A1 12/2013 Ise
(Continued)

FOREIGN PATENT DOCUMENTS

JP 2014-14069 A 1/2014
JP 2015-80179 A 4/2015
(Continued)

OTHER PUBLICATIONS

International Search Report issued in International Application No. PCT/JP2019/044511 dated Jan. 21, 2020.
(Continued)

*Primary Examiner* — Padma Haliyur
(74) *Attorney, Agent, or Firm* — Solaris Intellectual Property Group, PLLC

(57) ABSTRACT

Provided is an imaging element in which a first frame rate is a frame rate higher than a second frame rate, and a first processor is configured to read out image data of a plurality of frames in parallel within an output period of image data of one frame defined by the second frame rate, acquire a focus driving speed and a rolling shift amount, decide a combining condition for the image data of the plurality of frames stored in a memory based on the acquired focus driving speed and the rolling shift amount, perform combining processing on the image data of the plurality of frames in accordance with the decided combining condition, and output the image data after combining obtained by the combining processing.

15 Claims, 15 Drawing Sheets

(58) Field of Classification Search
CPC .. H04N 5/3532; H04N 5/232; H04N 5/23216; H04N 5/23245; G03B 13/36
See application file for complete search history.

(56) References Cited

U.S. PATENT DOCUMENTS

| | | |
|---|---|---|
| 2015/0163403 A1 | 6/2015 | Wakabayashi |
| 2015/0264279 A1 | 9/2015 | Kobuse |
| 2016/0234424 A1* | 8/2016 | Ito .................. H04N 5/2353 |
| 2016/0381319 A1* | 12/2016 | Nakajima ............. H04N 5/147 |
| | | 348/231.99 |

FOREIGN PATENT DOCUMENTS

| | | |
|---|---|---|
| JP | 2015-177302 A | 10/2015 |
| JP | 2018-6993 A | 1/2018 |
| WO | 2014/007004 A1 | 1/2014 |

OTHER PUBLICATIONS

Written Opinion of the ISA issued in International Application No. PCT/JP2019/044511 dated Jan. 21, 2020.

\* cited by examiner

DEPTH OF FIELD

IMAGING ELEMENT, IMAGING APPARATUS, IMAGE DATA PROCESSING METHOD, AND PROGRAM

CROSS-REFERENCE TO RELATED APPLICATIONS

This application is a continuation of International Application No. PCT/JP2019/044511, filed on Nov. 13, 2019, which claims priority to Japanese Patent Application No. 2018-245749, filed on Dec. 27, 2018. The entire disclosures of both of the above-referenced applications are hereby incorporated by reference into the present application.

BACKGROUND

Technical Field

The present disclosure relates to an imaging element, an imaging apparatus, an image data processing method, and a program.

Related Art

JP2018-006993A discloses an image processing apparatus that generates a third image by performing processing of improving an S/N (signal to noise) ratio of a first image among a plurality of consecutively acquired images, and generates a fourth image by performing processing of improving an S/N ratio of a second image among the plurality of images. This image processing apparatus generates a first combined image by combining the first image with the fourth image, and generates a second combined image by combining the second image with the third image.

WO2014/007004A discloses an imaging apparatus comprising a signal processing portion that transfers, at a first speed higher than a frame rate, pixel data obtained by digitizing an analog pixel signal read out into a signal line from each pixel of a pixel array portion. This imaging apparatus further comprises a memory portion that holds the pixel data transferred from the signal processing portion, and a data processing portion that reads out the pixel data from the memory portion at a second speed lower than the first speed. In addition, this imaging apparatus further comprises a control portion that performs a control for stopping an operation of a current source connected to the signal line and an operation of the signal processing portion in a case of reading out the pixel data from the memory portion.

In a case where imaging using a rolling shutter method is performed in the imaging apparatus, a rolling shift of an electronic shutter occurs. Here, for example, the rolling shift of the electronic shutter refers to a phenomenon of a difference in time from a start of exposure on a head line of a photoelectric conversion element to a start of exposure on a last line.

In addition, in a case of consecutively imaging a subject like a motion picture image, a time period for moving a focus lens between consecutive frames cannot be sufficiently secured. Thus, the subject may be imaged while the focus lens is moved. In this case, due to the rolling shift, for example, a focused state is set in imaging for obtaining an upper portion of an image, and the focused state is not set in imaging for obtaining a lower portion of the image. Thus, a situation in which the lower portion of the image is blurred compared to the upper portion of the image may occur. That is, in a case of performing imaging during focus driving using the rolling shutter method, image quality may be decreased.

SUMMARY

The present disclosure provides an imaging element, an imaging apparatus, an image data processing method, and a program capable of suppressing a decrease in image quality that occurs in a case of performing imaging during focus driving using a rolling shutter method.

An imaging element of the present disclosure comprises a storage portion that is incorporated in the imaging element, and a first processor that is incorporated in the imaging element. The first processor is configured to read out image data obtained by imaging a subject at a first frame rate, process the image data, and output the processed image data at a second frame rate. The storage portion stores the image data which is read out. The first frame rate is a frame higher than the second frame rate. The first processor is configured to read out the image data of a plurality of frames in parallel within an output period of the image data of one frame defined by the second frame rate, acquire a focus driving speed and a rolling shift amount, decide a combining condition for the image data of the plurality of frames stored in the storage portion based on the acquired focus driving speed and the rolling shift amount, and perform combining processing on the image data of the plurality of frames in accordance with the decided combining condition, and output the image data after combining obtained by the combining processing.

In the imaging element of the present disclosure, the first processor may be configured to decide, as the combining condition, a range of an image within a predetermined depth of field threshold value as a combining range of images for the combining processing.

In the imaging element of the present disclosure, the first processor may be configured to perform the combining processing using a part, out of the image data of the plurality of frames stored in the storage portion, that is read out in a state where a focus position is within the depth of field threshold value.

In the imaging element of the present disclosure, the first processor may be configured to, in a case where the part read out in a state where the focus position is within the depth of field threshold value overlaps in the image data of the plurality of frames stored in the storage portion, perform the combining processing by calculating an arithmetic mean of pixel values of pixels corresponding in position or by using pixel values of any image for the overlapping part.

In the imaging element of the present disclosure, the first processor may be configured to decide, as the combining condition, a combining range of images for the combining processing based on a focal position that is predicted by predictive auto focus in which the focal position is predicted by auto focus.

In the imaging element of the present disclosure, in a case where a flicker is detected, the first processor may be configured to decide, as the combining condition, a combining range of images for the combining processing based on a timing at which an effect of the flicker is avoided.

In the imaging element of the present disclosure, the first processor may be configured to, in a case where the image data is read out from a plurality of photosensors arranged in a matrix form, set the number of divided exposure periods within the output period of the image data of one frame defined by the second frame rate to a value corresponding to the number of lines on which analog-to-digital (AD) conversion is performed at the same time.

In the imaging element of the present disclosure, the first processor may be configured to set the number of divided exposure periods to a value less than or equal to the number of lines on which the AD conversion is performed at the same time.

In the imaging element of the present disclosure, the first processor may be configured to, in a case where an image indicated by the image data is cropped, set a cropped region as a target range of the combining processing.

In the imaging element of the present disclosure, at least a photoelectric conversion element and the storage portion may be formed in one chip.

In the imaging element of the present disclosure, the imaging element may be a laminated imaging element in which the photoelectric conversion element is laminated with the storage portion.

An imaging apparatus of the present disclosure comprises the imaging element of the present disclosure, and a second processor configured to perform a control for storing the image data output by the first processor included in the imaging element in a storage medium.

In the imaging apparatus of the present disclosure, the second processor may be configured to control the focus driving speed in accordance with the rolling shift amount and a depth of field.

An image data processing method of the present disclosure is an image data processing method of an imaging element incorporating a first processor configured to read out image data obtained by imaging a subject at a first frame rate, process the image data, and output the processed image data at a second frame rate, and a storage portion that stores the image data read out by the first processor, the image data processing method comprising setting the first frame rate to a frame rate higher than the second frame rate, and by the first processor, reading out the image data of a plurality of frames in parallel within an output period of the image data of one frame defined by the second frame rate, acquiring a focus driving speed and a rolling shift amount, deciding a combining condition for the image data of the plurality of frames stored in the storage portion based on the acquired focus driving speed and the rolling shift amount, and performing combining processing on the image data of the plurality of frames in accordance with the decided combining condition, and outputting the image data after combining obtained by the combining processing.

A program of the present disclosure causes a computer to execute an image data process in an imaging element that reads out image data obtained by imaging a subject at a first frame rate, stores the image data which is read out in a storage portion, processes the image data, and outputs the processed image data at a second frame rate, the first frame rate being a frame rate higher than the second frame rate, the image data process comprising reading out the image data of a plurality of frames in parallel within an output period of the image data of one frame defined by the second frame rate, acquiring a focus driving speed and a rolling shift amount, deciding a combining condition for the image data of the plurality of frames stored in the storage portion based on the acquired focus driving speed and the rolling shift amount, and performing combining processing on the image data of the plurality of frames in accordance with the decided combining condition, and outputting the image data after combining obtained by the combining processing.

According to the present disclosure, a decrease in image quality caused in a case of performing imaging during focus driving using a rolling shutter method can be suppressed.

DETAILED DESCRIPTION

Hereinafter, embodiments of the technology of the present disclosure will be described in detail with reference to the drawings.

First Embodiment

Figure 1:
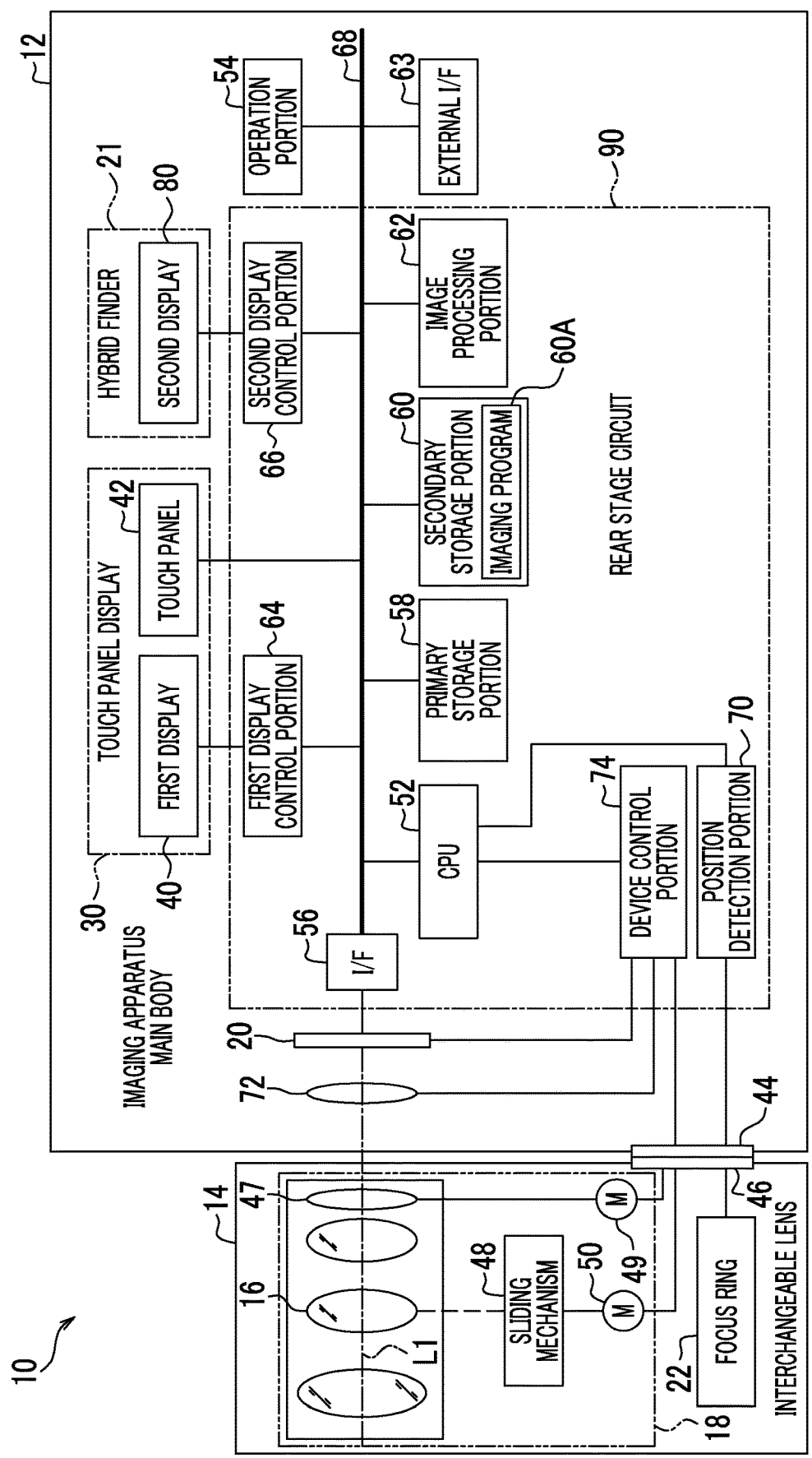
FIG. 1 is a block diagram illustrating an example of a hardware configuration of an imaging apparatus according to each embodiment.

A configuration of an imaging apparatus 10 according to the present embodiment will be described with reference to FIG. 1. As illustrated in FIG. 1, the imaging apparatus 10 is an interchangeable lens digital camera that includes an imaging apparatus main body 12 and an interchangeable lens 14 interchangeably mounted on the imaging apparatus main body 12, and that does not include a reflex mirror. The interchangeable lens 14 includes an imaging lens 18 including a focus lens 16 that is movable in a direction of an optical axis L1.

A hybrid finder (registered trademark) 21 is disposed in the imaging apparatus main body 12. For example, the hybrid finder 21 here refers to a finder in which an optical viewfinder (hereinafter, referred to as the "OVF") and an electronic viewfinder (hereinafter referred to as the "EVF") are selectively used. A display is switched between an optical image visually recognizable by the OVF and an electronic image (live view image) visually recognizable by the EVF by a finder switching lever disposed in the imaging apparatus main body 12. The live view image refers to a motion picture image for displaying obtained by imaging performed by a photoelectric conversion element.

A focus ring 22 that is used in a case of a manual focus mode is disposed in a lens barrel of the interchangeable lens 14. The focus lens 16 moves along the optical axis L1 in accordance with a manual rotation operation of the focus ring 22, and an image of subject light showing a subject is formed on an imaging element 20, described later, at a focal position corresponding to a subject distance. In the present embodiment, the "focal position" refers to a position of the focus lens 16 on the optical axis L1 in a focused state.

In addition, a release button is disposed on an upper surface of the imaging apparatus main body 12. The release button functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10 according to the present embodiment, an imaging mode and a playback mode are selectively set as an operation mode in accordance with an instruction of a user. In the imaging mode, a manual focus mode and an auto focus mode are selectively set in accordance with an instruction of the user. In the auto focus mode, an imaging condition is adjusted by setting the release button to the half push state. Then, in a case where the full push state is subsequently set, exposure is performed. That is, by setting the release button to the half push state, an automatic exposure (AE) function is operated, and an exposure state is set. Then, an auto-focus (AF) function is operated, and a focusing control is performed. In a case where the release button is set to the full push state, imaging is performed.

In addition, the imaging apparatus 10 has a still picture imaging mode and a motion picture imaging mode as an operation mode of an imaging system. The still picture imaging mode is an operation mode in which a still picture image obtained by imaging the subject by the imaging apparatus 10 is recorded, and the motion picture imaging mode is an operation mode in which a motion picture image obtained by imaging the subject by the imaging apparatus 10 is recorded.

A touch panel display 30 is disposed on a rear surface of the imaging apparatus main body 12. The touch panel display 30 comprises a liquid crystal display (hereinafter, referred to as a "first display") 40 and a touch panel 42.

The first display 40 displays images, text information, and the like. The first display 40 is used for displaying the live view image (live preview image) that is an example of a consecutive frame image obtained by imaging in consecutive frames in a case of the imaging mode. In addition, the first display 40 is used for displaying a still picture image that is an example of a single frame image obtained by imaging in a single frame in a case where a still picture imaging instruction is provided. Furthermore, the first display 40 is used for displaying a playback image and displaying a menu screen and the like in the playback mode.

The touch panel 42 is a transmissive touch panel and is overlaid on a surface of a display region of the first display 40. The touch panel 42 detects a contact of an instruction object such as a finger or a stylus pen.

The imaging apparatus 10 includes a mount 44 comprised in the imaging apparatus main body 12, and a mount 46 on an interchangeable lens 14 side corresponding to the mount 44. The interchangeable lens 14 is interchangeably mounted on the imaging apparatus main body 12 by joining the mount 46 to the mount 44.

The imaging lens 18 includes a stop 47 and a motor 49. The stop 47 is arranged closer to the imaging apparatus main body 12 side than the focus lens 16 and is connected to the motor 49. The stop 47 operates by receiving motive power of the motor 49 and adjusts the exposure.

The imaging lens 18 includes a sliding mechanism 48 and a motor 50. The sliding mechanism 48 moves the focus lens 16 along the optical axis L1 by operating the focus ring 22. The focus lens 16 is attached to the sliding mechanism 48 in a slidable manner along the optical axis L1. In addition, the motor 50 is connected to the sliding mechanism 48, and the sliding mechanism 48 moves the focus lens 16 along the optical axis L1 by receiving motive power of the motor 50.

The motors 49 and 50 are connected to the imaging apparatus main body 12 through the mounts 44 and 46, and driving of the motors 49 and 50 is controlled in accordance with a command from the imaging apparatus main body 12. In the present embodiment, stepping motors are applied as an example of the motors 49 and 50. Accordingly, the motors 49 and 50 operate in synchronization with pulse electric power in accordance with the command from the imaging apparatus main body 12. While an example of disposing the motors 49 and 50 in the imaging lens 18 is illustrated in the example illustrated in FIG. 1, the technology of the present disclosure is not limited thereto. The motors 49 and 50 may be disposed in the imaging apparatus main body 12.

In addition, the imaging apparatus main body 12 comprises an operation portion 54, an external interface (I/F) 63, and a rear stage circuit 90. The rear stage circuit 90 is a circuit on a side of receiving data transmitted from the imaging element 20. In the present embodiment, an integrated circuit (IC) is employed as the rear stage circuit 90. A large-scale integration (LSI) is illustrated as an example of the IC.

The rear stage circuit 90 includes a central processing unit (CPU) 52, an I/F 56, a primary storage portion 58, a secondary storage portion 60, an image processing portion 62, a first display control portion 64, a second display control portion 66, a position detection portion 70, and a device control portion 74. While a single CPU is illustrated as the CPU 52 in the present embodiment, the present disclosure is not limited thereto. A plurality of CPUs may be employed instead of the CPU 52. The CPU 52 is a hardware processor and is an example of a second processor.

While each of the image processing portion 62, the first display control portion 64, the second display control portion 66, the position detection portion 70, and the device control portion 74 is implemented by an application specific integrated circuit (ASIC) in the present embodiment, the technology of the present disclosure is not limited thereto. For example, instead of the ASIC, at least one of a programmable logic device (PLD) or a field-programmable gate array (FPGA) may be employed. In addition, at least one of the ASIC, the PLD, or the FPGA may be employed. In addition, a computer including a CPU, a read only memory (ROM), and a random access memory (RAM) may be employed. The number of CPUs may be singular or plural. In addition, at least one of the image processing portion 62, the first display control portion 64, the second display control portion 66, the position detection portion 70, or the device control portion 74 may be implemented by a combination of a hardware configuration and a software configuration.

The CPU 52, the I/F 56, the primary storage portion 58, the secondary storage portion 60, the image processing portion 62, the first display control portion 64, the second display control portion 66, the operation portion 54, the external I/F 63, and the touch panel 42 are connected to each other through a bus 68.

Figure 2:
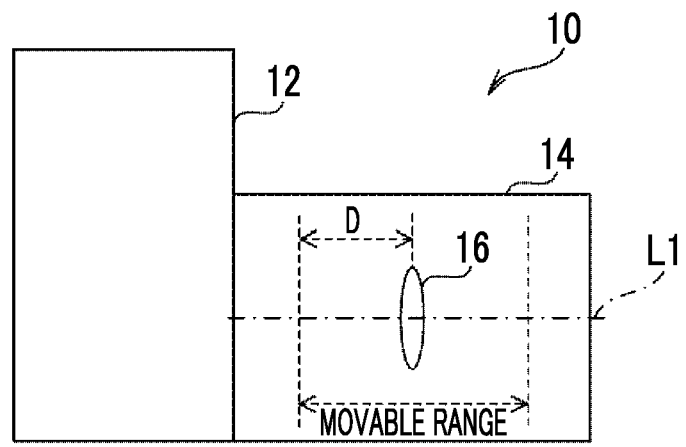
FIG. 2 is a side view for describing a focus position according to each embodiment.

The CPU 52 controls the entire imaging apparatus 10. In the imaging apparatus 10 according to the present embodiment, in the auto focus mode, the CPU 52 moves the focus lens 16 along the optical axis L1 to the focal position obtained using an image plane phase difference AF method by driving the motor 50. Hereinafter, the position of the focus lens 16 along the optical axis L1 will be referred to as a "focus position". In addition, in the present embodiment, as illustrated in FIG. 2 as an example, the focus position is represented by a distance (in the example in FIG. 2, a distance denoted by "D") based on a predetermined position. For example, the "predetermined position" is a position of an end portion of a movable range of the focus lens 16 on the imaging apparatus main body 12 side. In addition, hereinafter, a driving speed of the focus lens 16 driven in the auto focus mode, that is, a movement amount of the focus lens 16 per unit time period, will be referred to as a "focus driving speed".

The primary storage portion 58 means a volatile memory and refers to, for example, a RAM. The secondary storage portion 60 means a non-volatile memory and refers to, for example, a flash memory or a hard disk drive (HDD).

The secondary storage portion 60 stores an imaging program 60A. The CPU 52 reads out the imaging program 60A from the secondary storage portion 60 and loads the read imaging program 60A into the primary storage portion 58. The CPU 52 executes imaging processing (refer to FIG. 17) described later in accordance with the imaging program 60A loaded in the primary storage portion 58. The secondary storage portion 60 is an example of a "storage medium" according to the embodiments of the technology of the present disclosure.

The operation portion 54 is a user interface that is operated by the user in a case of issuing various instructions to the rear stage circuit 90. The operation portion 54 includes the release button and the finder switching lever. In addition, the operation portion 54 includes a dial, a cross key, a menu key, an instruction button, and the like. Various instructions received by the operation portion 54 are output to the CPU 52 as an operation signal, and the CPU 52 executes processing corresponding to the operation signal input from the operation portion 54.

The position detection portion 70 is connected to the CPU 52. The position detection portion 70 is connected to the focus ring 22 through the mounts 44 and 46, detects a rotation angle of the focus ring 22, and outputs rotation angle information indicating the rotation angle that is a detection result, to the CPU 52. The CPU 52 executes processing corresponding to the rotation angle information input from the position detection portion 70.

In a case where the imaging mode is set, the image of the subject light is formed on a light receiving surface of the color imaging element 20 through the imaging lens 18 and a mechanical shutter 72.

The device control portion 74 is connected to the CPU 52. In addition, the device control portion 74 is connected to the imaging element 20 and the mechanical shutter 72. Furthermore, the device control portion 74 is connected to the motors 49 and 50 of the imaging lens 18 through the mounts 44 and 46.

The device control portion 74 controls the imaging element 20, the mechanical shutter 72, and the motors 49 and 50 under control of the CPU 52.

Figure 3:
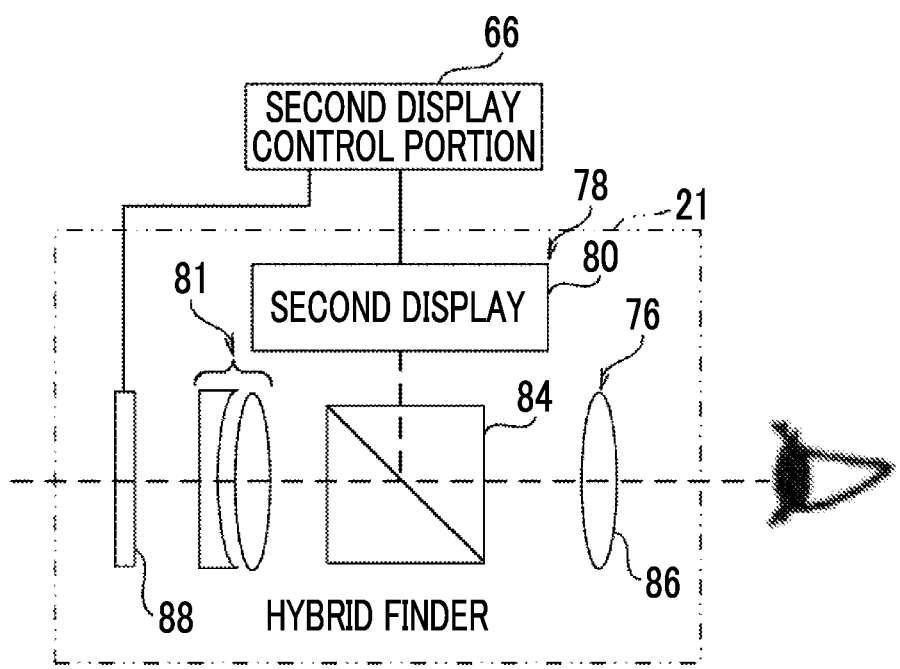
FIG. 3 is a schematic configuration diagram illustrating an example of a configuration of a hybrid finder included in the imaging apparatus according to each embodiment.

As illustrated in FIG. 3 as an example, the hybrid finder 21 includes an OVF 76 and an EVF 78. The OVF 76 is a reverse Galilean finder including an objective lens 81 and an eyepiece lens 86, and the EVF 78 includes a second display 80, a prism 84, and the eyepiece lens 86.

A liquid crystal shutter 88 is arranged in front of the objective lens 81. The liquid crystal shutter 88 blocks light such that the optical image is not incident on the objective lens 81 in a case of using the EVF 78.

The prism 84 reflects and guides the electronic image or various types of information displayed on the second display 80 to the eyepiece lens 86 and combines the optical image with at least one of the electronic image or the various types of information displayed on the second display 80.

In a case where the finder switching lever is rotationally moved, an OVF mode in which the optical image is visually recognizable by the OVF 76 and an EVF mode in which the electronic image is visually recognizable by the EVF 78 are alternately switched at each rotational movement of the finder switching lever.

In a case of the OVF mode, the second display control portion 66 enables the optical image to be visually recognized from an eyepiece portion by controlling the liquid crystal shutter 88 to a non-light blocking state. In a case of the EVF mode, the second display control portion 66 enables only the electronic image displayed on the second display 80 to be visually recognized from the eyepiece portion by controlling the liquid crystal shutter 88 to a light blocking state.

Figure 4:
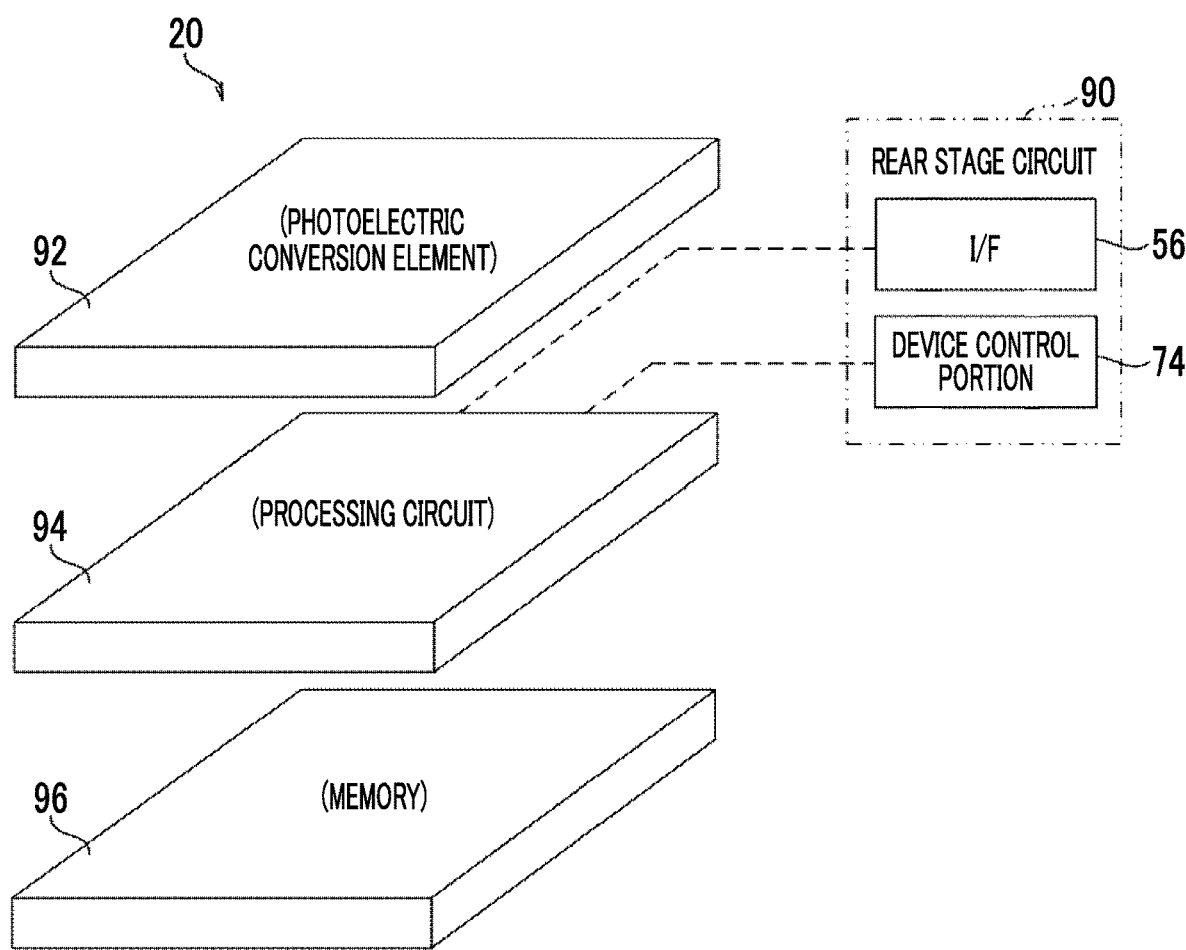
FIG. 4 is a schematic configuration diagram illustrating an example of a schematic configuration of an imaging element included in the imaging apparatus according to each embodiment.

The imaging element 20 is an example of a "laminated imaging element" according to the embodiments of the technology of the present disclosure. For example, the imaging element 20 is a complementary metal oxide semiconductor (CMOS) image sensor. As illustrated in FIG. 4 as an example, the imaging element 20 incorporates a photoelectric conversion element 92, a processing circuit 94, and a memory 96. The memory 96 is an example of a "storage portion" according to the embodiments of the present disclosure.

The imaging element 20 is an imaging element in which the photoelectric conversion element 92, the processing circuit 94, and the memory 96 are formed in one chip. That is, the photoelectric conversion element 92, the processing circuit 94, and the memory 96 are formed in one package. In addition, in the imaging element 20, the photoelectric conversion element 92 is laminated with the processing circuit 94 and the memory 96. Specifically, the photoelectric conversion element 92 and the processing circuit 94 are electrically connected to each other by a bump of copper or the like having conductivity. The processing circuit 94 and the memory 96 are also electrically connected to each other by a bump of copper or the like having conductivity.

The processing circuit 94 is, for example, an LSI, and the memory 96 is, for example, a RAM. A dynamic random access memory (DRAM) is employed as an example of the memory 96 in the present embodiment. However, the present disclosure is not limited thereto, and a static random access memory (SRAM) may be used.

The processing circuit 94 is implemented by an ASIC in the present embodiment. However, the technology of the present disclosure is not limited thereto. For example, at least one of a PLD or an FPGA may be employed instead of the ASIC. In addition, at least one of the ASIC, the PLD, or the FPGA may be employed. In addition, a computer including a CPU, a ROM, and a RAM may be employed. The number of CPUs may be singular or plural. In addition, the processing circuit 94 may be implemented by a combination of a hardware configuration and a software configuration.

The photoelectric conversion element 92 includes a plurality of photosensors arranged in a matrix form. In the present embodiment, photodiodes are employed as an example of the photosensors. In addition, photodiodes of "4896×3265" pixels are illustrated as an example of the plurality of photosensors.

The photoelectric conversion element 92 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating every color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated here as the imaging element 20, the technology of the present disclosure is not limited thereto. For example, the technology of the present disclosure is also established in a case where the photoelectric conversion element 92 is a charge coupled device (CCD) image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called shutter speed.

In the imaging apparatus 10, imaging for the still picture image and imaging for the motion picture image are performed using a rolling shutter method. The imaging for the still picture image is implemented by performing the electronic shutter function and operating the mechanical shutter 72. The imaging for the motion picture image is implemented by performing the electronic shutter function without operating the mechanical shutter 72.

The processing circuit 94 is controlled by the device control portion 74. The processing circuit 94 reads out captured image data obtained by imaging the subject by the photoelectric conversion element 92. The "captured image data" here refers to image data indicating the subject. The captured image data is signal electric charges accumulated in the photoelectric conversion element 92. The processing circuit 94 performs analog-to-digital (AD) conversion on the captured image data read out from the photoelectric conversion element 92. The processing circuit 94 stores the captured image data obtained by performing the AD conversion on the captured image data in the memory 96. The processing circuit 94 acquires the captured image data from the memory 96 and outputs, to the I/F 56 of the rear stage circuit 90, output image data that is image data based on the acquired captured image data. Hereinafter, for convenience of description, the "output image data that is image data based on the captured image data" will be simply referred to as the "output image data".

The processing circuit 94 performs first processing and second processing on the captured image data. The first processing refers to processing of reading out the captured image data from the photoelectric conversion element 92 and storing the read captured image data in the memory 96. The second processing refers to processing of outputting the output image data to an outside of the imaging element 20. For example, the "outside of the imaging element 20" refers to the I/F 56 of the rear stage circuit 90.

In the imaging element 20, the subject is imaged at a first frame rate. The processing circuit 94 performs the first processing at the first frame rate and performs the second processing at a second frame rate. The first frame rate is a frame rate higher than the second frame rate.

In the present embodiment, 60 frames per second (fps) is employed as an example of the second frame rate. However, the present disclosure is not limited thereto, and the second frame rate can be changed as long as a relationship "second frame rate<first frame rate" is satisfied. In addition, the first frame rate is a frame rate that is variable within a range higher than the second frame rate.

Figure 5:
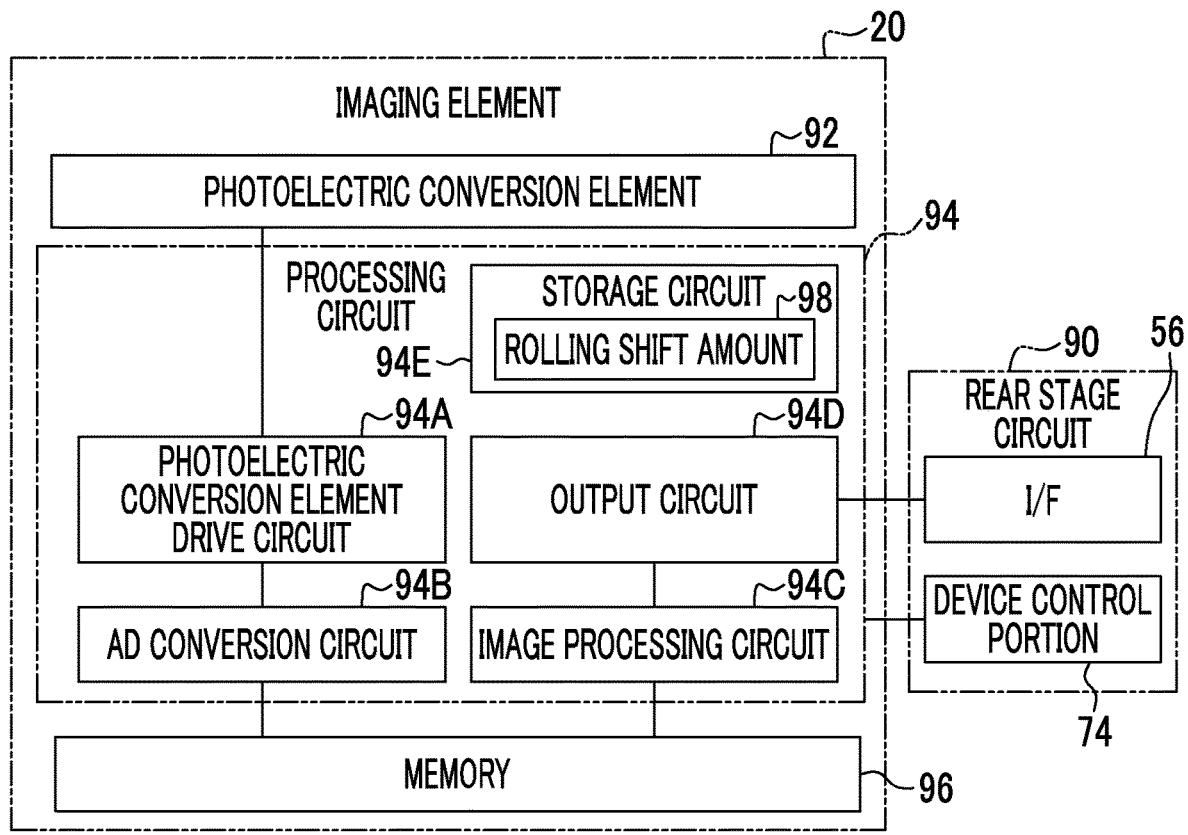
FIG. 5 is a block diagram illustrating an example of a main configuration of the imaging element included in the imaging apparatus according to each embodiment.

As illustrated in FIG. 5 as an example, the processing circuit 94 includes a photoelectric conversion element drive circuit 94A, an AD conversion circuit 94B, an image processing circuit 94C, an output circuit 94D, and a storage circuit 94E. The processing circuit 94 operates under control of the CPU 52 through the device control portion 74. A rolling shift amount 98 is stored in the storage circuit 94E. Details of the rolling shift amount 98 will be described later. The photoelectric conversion element drive circuit 94A is an example of a "reading portion". The image processing circuit 94C is an example of a "processing portion". The output circuit 94D is an example of an "output portion". In addition, the rolling shift amount 98 may be stored in the secondary storage portion 60 of the imaging apparatus main body 12.

The photoelectric conversion element drive circuit 94A is connected to the photoelectric conversion element 92 and the AD conversion circuit 94B. The memory 96 is connected to the AD conversion circuit 94B and the image processing circuit 94C. The image processing circuit 94C is connected to the output circuit 94D. The output circuit 94D is connected to the I/F 56 of the rear stage circuit 90.

The photoelectric conversion element drive circuit 94A controls the photoelectric conversion element 92 and reads out, at the first frame rate, analog captured image data obtained by the photoelectric conversion element 92 by imaging the subject, under control of the device control portion 74. The AD conversion circuit 94B digitizes the captured image data read out by the photoelectric conversion element drive circuit 94A and stores the digitized captured image data in the memory 96. The memory 96 is a memory that can store the captured image data of a plurality of frames. The image processing circuit 94C processes the captured image data. The output circuit 94D outputs the captured image data (that is, the output image data) processed by the image processing circuit 94C at the second frame rate.

Figure 6:
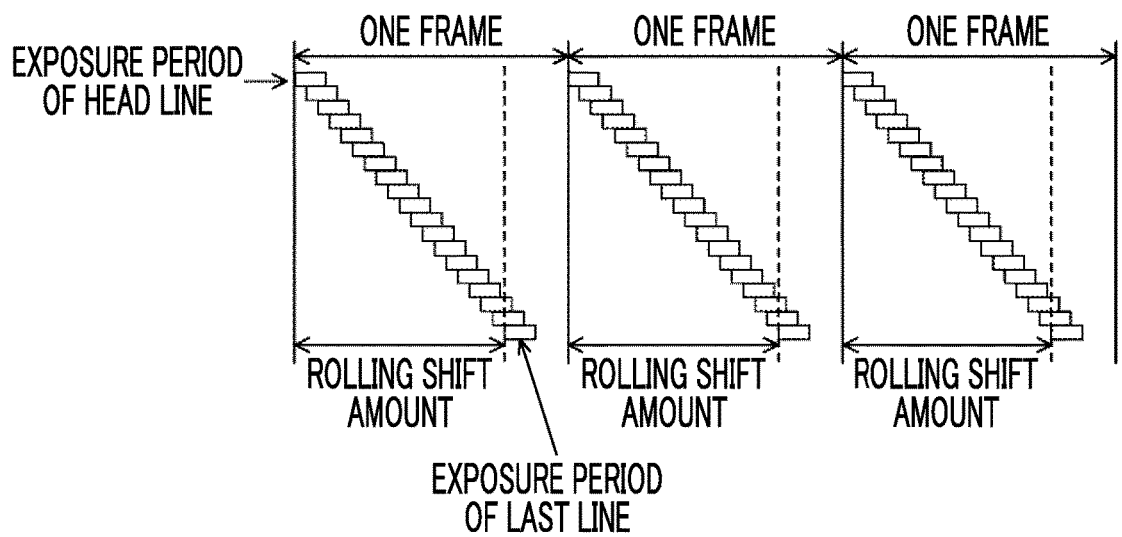
FIG. 6 is a diagram for describing a rolling shift amount.

In the imaging for the motion picture image, it is preferable to perform imaging based on the exposure depending on an exposure period that is as close to an output period of one frame defined by the second frame rate as possible. However, as in a case of a relatively bright environment or the like, for example, in a case where imaging is performed based on the exposure period having the same length as the output period of one frame, overexposure may be performed. Thus, as illustrated in FIG. 6 as an example, the exposure period may be shortened with respect to the output period of one frame. One rectangle in FIG. 6 represents the exposure period for one line. In addition, as illustrated in FIG. 6, in the present embodiment, a phenomenon of a difference in time from a start of the exposure on a head line of the photoelectric conversion element 92 to a start of the exposure on a last line will be referred to as a "rolling shift", and this difference in time will be referred to as a "rolling shift amount". The rolling shift amount 98 of the imaging element 20 is stored in advance in the storage circuit 94E. This rolling shift amount is decided by a reading speed of the photodiode.

In a case of shortening the exposure period with respect to the output period of one frame (for example, in a case of setting the exposure period in the imaging for the motion picture image of a frame rate of 60 fps to 1/1000 seconds), a ratio of the exposure period in one frame is decreased with respect to the output period of one frame. Thus, in this case, due to an increase in the difference in time of an exposure timing between frames, an intermittent motion picture image such as a frame-advanced motion picture image may be seen.

Figure 7:
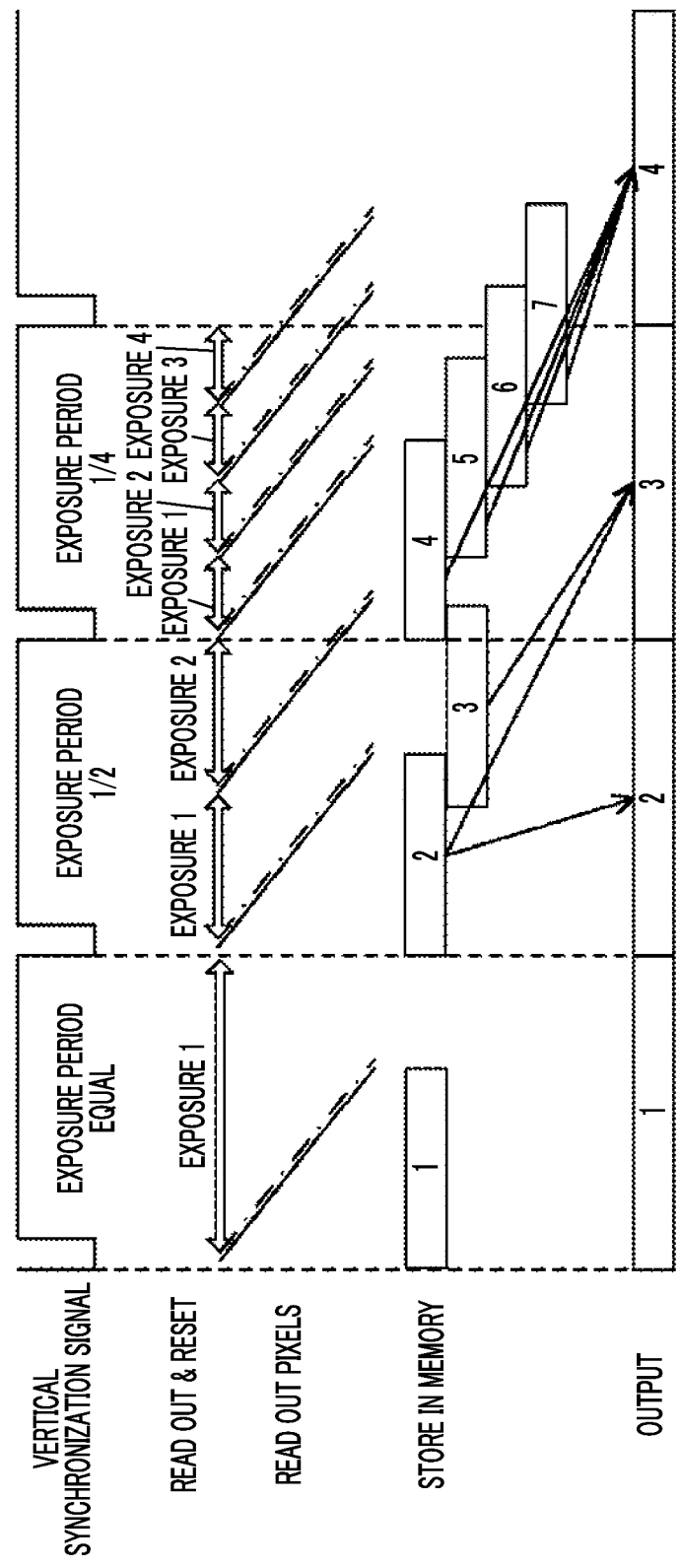
FIG. 7 is a diagram for describing divided exposure periods.

Therefore, as illustrated in FIG. 7, for example, it is considered that the exposure period is divided into any periods of ½ or ¼ by reading out the image data from the photoelectric conversion element 92 and resetting even at a timing different from a synchronization timing based on a vertical synchronization signal. FIG. 7 illustrates an example in which the exposure period within an output frame rate (that is, the second frame rate) is set to be equal, ½, and ¼. The first frame rate is defined by the second frame rate and the number of divided exposure periods.

By dividing the exposure period, a plurality of pieces of captured image data corresponding to the number of divided exposure periods are stored in the memory 96. As illustrated in FIG. 7, image data obtained by calculating an arithmetic mean of the plurality of pieces of captured image data stored in the memory 96 for each pixel corresponding in position is output as the output image data. Accordingly, an impression of frame advance between frames can be reduced.

Figure 8A:
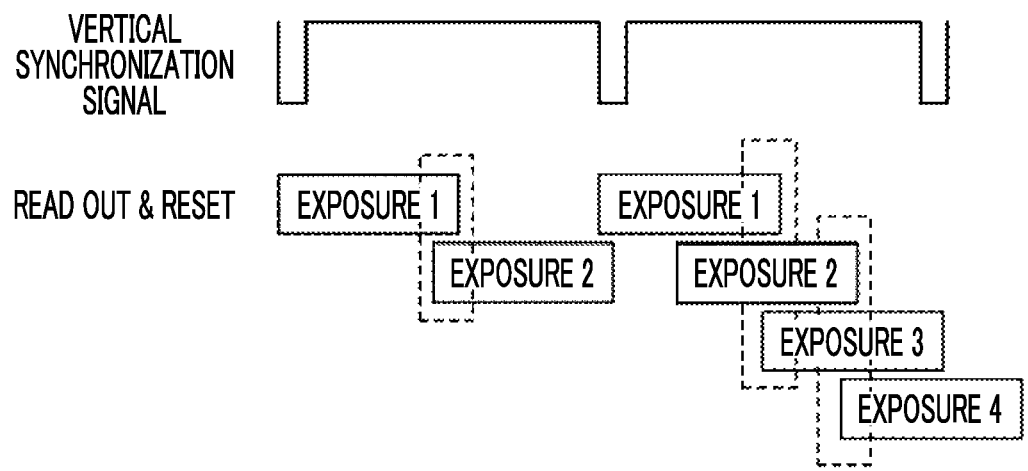
FIG. 8A is a diagram for describing the number of exposure periods and the number of lines on which AD conversion can be performed.

For example, the number of divided exposure periods can be decided in accordance with the number of lines of the photoelectric conversion element 92 on which the AD conversion can be performed at the same time. As illustrated in FIG. 8A, in a case where the number of divided exposure periods is set to two, and the number of lines on which the AD conversion can be performed at the same time is two, the captured image data can be read out at a high speed by making a partial overlap between two exposure periods. The reason is that the captured image data can be read out from each of two different lines in the photoelectric conversion element 92 and be subjected to the AD conversion at the same time.

In addition, as illustrated in FIG. 8A, in a case where the number of divided exposure periods is set to four without decreasing a reading speed of the captured image data, for example, the number of lines on which the AD conversion can be performed at the same time may be three. However, the number of lines on which the AD conversion can be performed at the same time may also be two due to a constraint and the like of a hardware configuration.

Figure 8B:
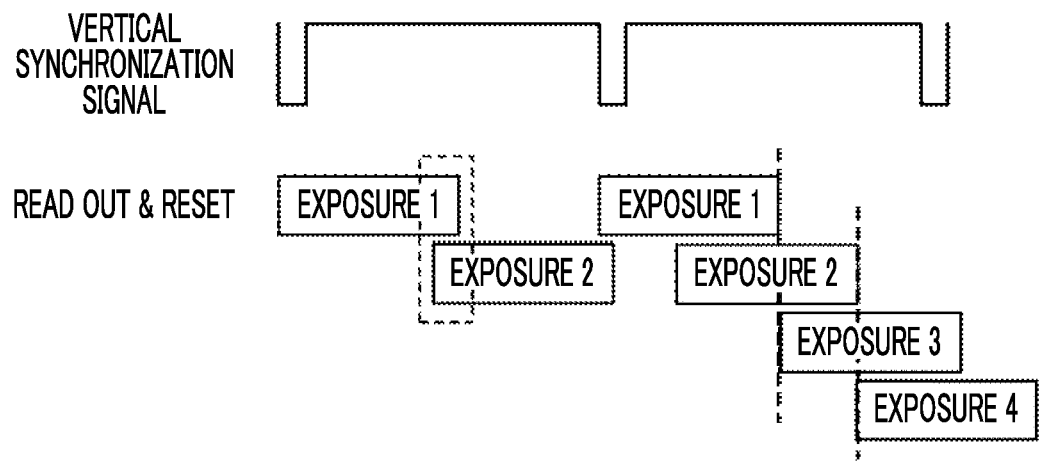
FIG. 8B is a diagram for describing the number of exposure periods and the number of lines on which the AD conversion can be performed.

In this case, as illustrated in FIG. 8B, the number of lines from which the captured image data is read out at the same time is set to two by decreasing the reading speed of the captured image data. However, in this case, as the reading speed is decreased, the accompanying rolling shift deteriorates. Therefore, in the present embodiment, the photoelectric conversion element drive circuit 94A divides the exposure period to extent not decreasing the reading speed. Specifically, the photoelectric conversion element drive circuit 94A sets the number of divided exposure periods to a value (in the present embodiment, two) less than or equal to the number of lines on which the AD conversion can be performed at the same time. However, the number of divided exposure periods is not limited to two and may be three or more. In addition, the number of divided exposure periods causing a state where the reading speed of the captured image data is decreased may be used.

In the imaging for the motion picture image, an image of each frame may be obtained by imaging the subject while moving the focus lens 16 in a state where a time period for moving the focus lens 16 to the focal position between output frames cannot be secured. In this case, since imaging is performed while the focus position is changed, a state of contrast may vary between an upper side and a lower side within the image due to the rolling shift. Specifically, for example, while contrast of the focused state is implemented in an upper region within the image, a situation of contrast of a non-focused state in a lower region within the image, that is, blurriness, may occur. In this case, image quality is decreased, compared to a case where the entirety within the image has the contrast of the focused state.

The above decrease in image quality also occurs in a case where the output image data is combined by calculating the arithmetic mean of the plurality of pieces of captured image data obtained by dividing the exposure period. Therefore, in the imaging apparatus 10 according to the present embodiment, a combining condition for a plurality of pieces of image data is decided based on the focus driving speed and the rolling shift amount, and combining processing is performed on the image data in accordance with the decided combining condition.

Figure 9:
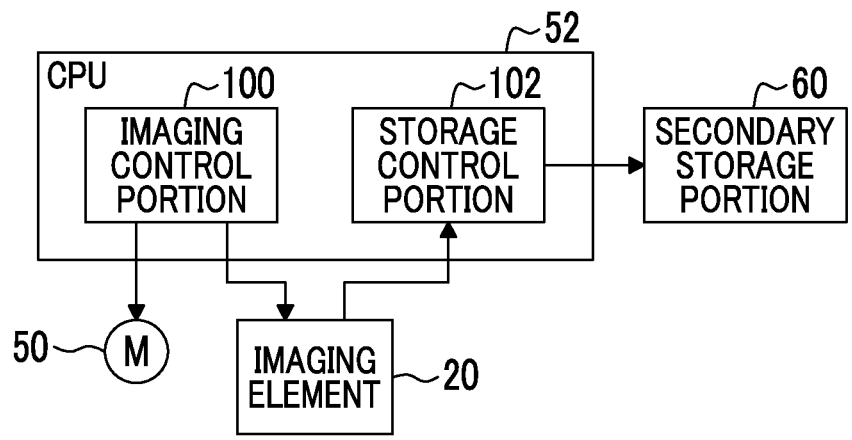
FIG. 9 is a block diagram illustrating an example of a functional configuration of a CPU of the imaging apparatus according to each embodiment.

A functional configuration of the CPU 52 of the imaging apparatus main body 12 will be described with reference to FIG. 9. As illustrated in FIG. 9, the CPU 52 functions as an imaging control portion 100 and a storage control portion 102 by executing the imaging program 60A.

In a case where a motion picture image capturing instruction is input through the operation portion 54 by the user, the imaging control portion 100 outputs the vertical synchronization signal to the imaging element 20 in accordance with the output period of image data of one frame defined by the second frame rate. Accordingly, the imaging control portion 100 issues the motion picture image capturing instruction to the imaging element 20. At this point, the imaging control portion 100 moves the focus lens 16 at a predetermined focus driving speed along the optical axis L1 to the focal position obtained using the image plane phase difference AF method by driving the motor 50. For example, the predetermined focus driving speed may be the focus driving speed that is obtained by a test using an actual apparatus as the focus driving speed at which the focusing control of one frame can be completed within a period shorter than the exposure period of one frame.

Furthermore, the imaging control portion 100 generates the vertical synchronization signal corresponding to each frame and outputs the generated vertical synchronization signal to the imaging element 20. In addition, the imaging control portion 100 outputs the focus position and the focus driving speed at a timing of generating the vertical synchronization signal to the imaging element 20. In addition, the imaging control portion 100 derives a front depth of field and a rear depth of field at the timing of generating the vertical synchronization signal corresponding to each frame and outputs each derived depth of field to the imaging element 20. Specifically, the imaging control portion 100 derives the front depth of field and the rear depth of field in accordance with Expression (1) and Expression (2) below using a permissible circle of confusion, an F number, the subject distance, and a focal length. The "permissible circle of confusion" here is a value equal to a pixel pitch of the photoelectric conversion element 92. In addition, "^2" in Expression (1) and Expression (2) denotes a power of two.

$$\text{Front depth of field [mm]} = (\text{permissible circle of confusion [mm]} \times F \text{ number} \times \text{subject distance [mm]}^\wedge 2) \pm (\text{focal length [mm]}^\wedge 2 + \text{diameter of permissible circle of confusion [mm]} \times F \text{ number} \times \text{subject distance [mm]}) \quad (1)$$

$$\text{Rear depth of field [mm]} = (\text{permissible circle of confusion [mm]} \times F \text{ number} \times \text{subject distance [mm]}^\wedge 2) \pm (\text{focal length [mm]}^\wedge 2 - \text{diameter of permissible circle of confusion [mm]} \times F \text{ number} \times \text{subject distance [mm]}) \quad (2)$$

The storage control portion 102 performs a control for storing the image data output by the output circuit 94D of the imaging element 20 in the secondary storage portion 60. The storage control portion 102 may perform a control for storing the image data output by the output circuit 94D of the imaging element 20 in an external memory such as a memory card attachable to and detachable from the imaging apparatus main body 12.

Figure 10:
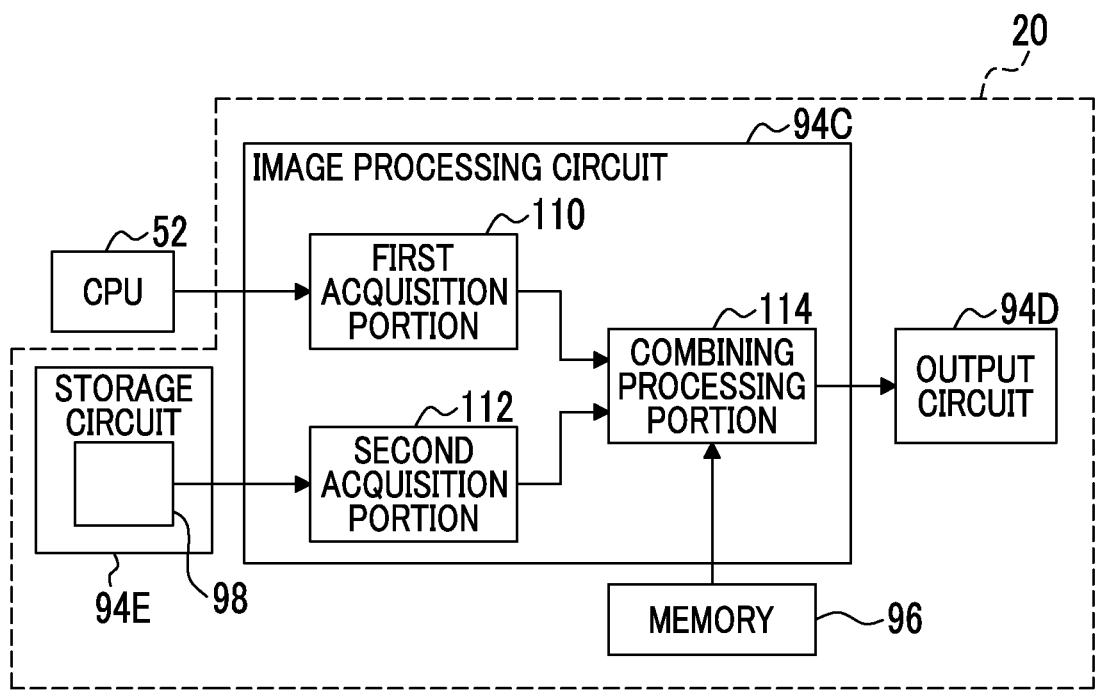
FIG. 10 is a block diagram illustrating an example of a functional configuration of an image processing circuit included in the imaging element according to each embodiment.

As illustrated in FIG. 10, the image processing circuit 94C functionally includes a first acquisition portion 110, a second acquisition portion 112, and a combining processing portion 114.

The first acquisition portion 110 acquires the focus position, the focus driving speed, the front depth of field, and the rear depth of field from the outside of the imaging element 20. In the example illustrated in FIG. 10, the outside of the imaging element 20 is the CPU 52.

The second acquisition portion 112 acquires the rolling shift amount 98 from the storage circuit 94E inside the imaging element 20.

Figure 11:
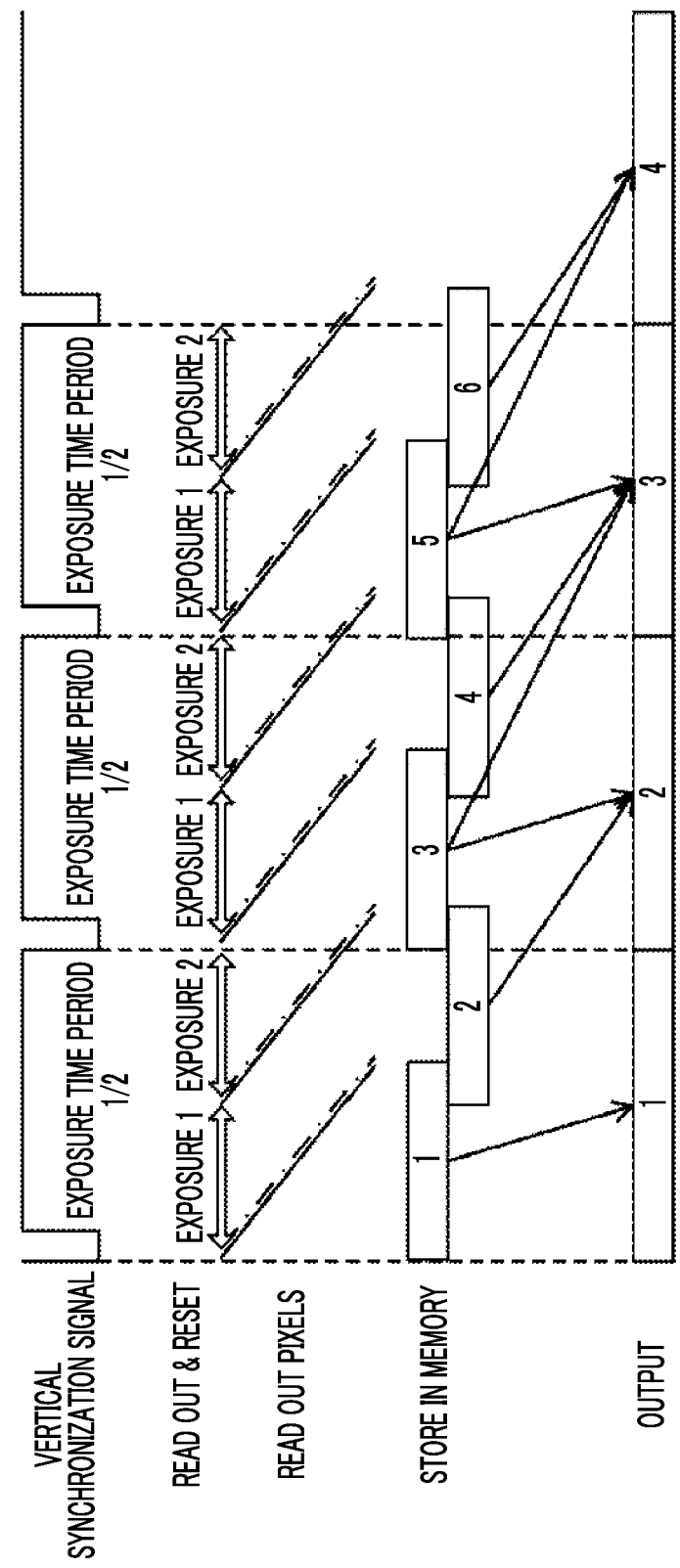
FIG. 11 is a diagram for describing combining processing of images according to a first embodiment.

As illustrated in FIG. 11 as an example, the combining processing portion 114 decides the combining condition for the captured image data (hereinafter, simply referred to as the "combining condition") of the plurality of frames stored in the memory 96 from the focus driving speed and the rolling shift amount 98. The combining processing portion 114 performs the combining processing on the captured image data of the plurality of frames in accordance with the decided combining condition.

Details of the combining processing will be described with reference to FIG. 12 and FIG. 13. As described above, in the present embodiment, the number of divided exposure periods within the output period defined by the second frame rate is two. That is, as illustrated in FIG. 12 as an example, the photoelectric conversion element drive circuit 94A reads out image data of two frames in parallel within the output period of the image data of one frame defined by the second frame rate.

Here, as described above, in a case where the vertical synchronization signal corresponding to each frame defined by the second frame rate is input into the imaging element 20 from the CPU 52, the focus position, the focus driving speed, the front depth of field, and the rear depth of field are also input. Accordingly, the combining processing portion 114 can derive the focus position at a timing of starting reading out a signal from each line of the photoelectric conversion element 92, using the focus position and the focus driving speed acquired by the first acquisition portion 110 and the rolling shift amount 98 acquired by the second acquisition portion 112. As an example, FIG. 12 illustrates the focus position at the timing of starting reading the signal from each of the head line, a center line, and the last line during the exposure performed twice within one frame defined by the second frame rate.

The combining processing portion 114 decides, as the combining condition, a range of images within a predetermined depth of field threshold value as a combining range of the images for the combining processing. Specifically, as illustrated in FIG. 12, the combining processing portion 114 sets the depth of field threshold value as a range, centered at a predetermined position, between the front depth of field and the rear depth of field acquired by the first acquisition portion 110. In the present embodiment, the combining processing portion 114 sets the depth of field threshold value as the range between the front depth of field and the rear depth of field based on the focus position at which it is assumed that the subject is focused. The combining range of the images is not limited to the depth of field threshold value. The combining range may be a range experimentally obtained in advance.

Figure 12:
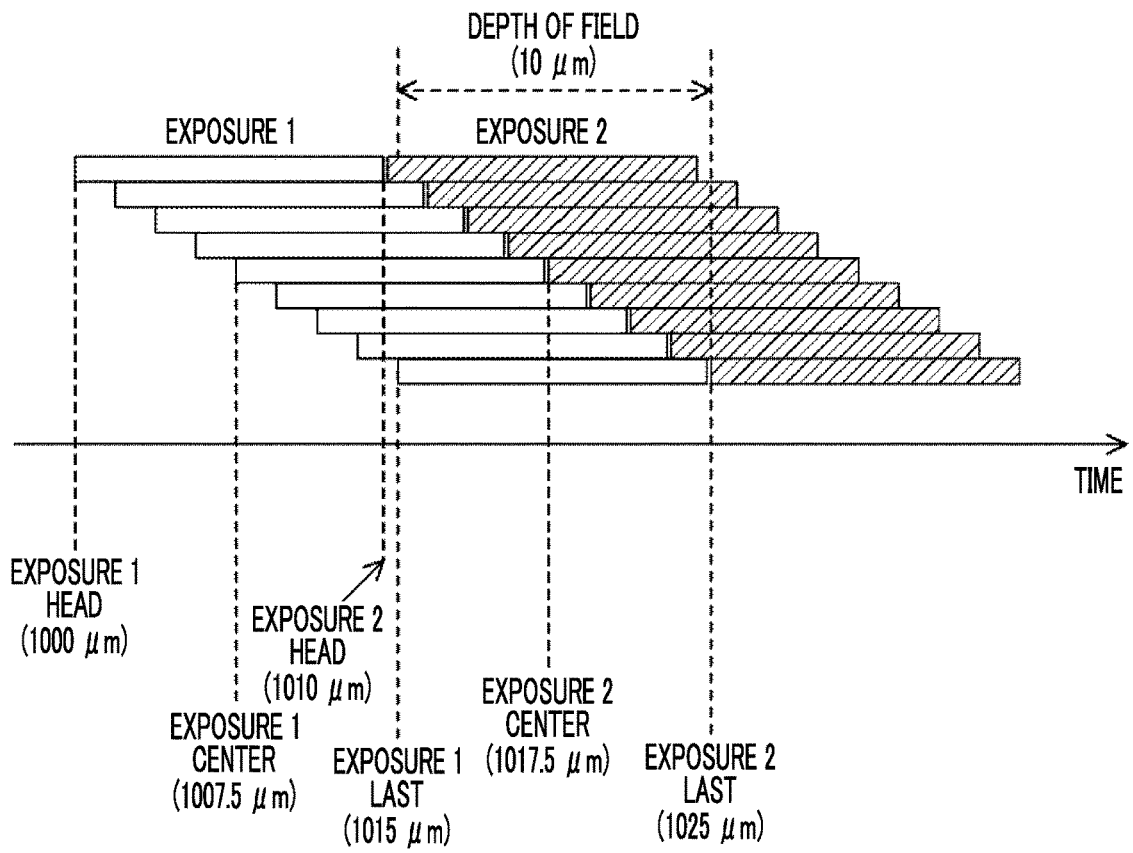
FIG. 12 is a diagram for describing a combining range of the images according to the first embodiment.

In the example in FIG. 12, in a case where it is assumed that the subject is focused in a state where the focus position is 1020 [μm], the focus position at +5 [μm] from 1020 [μm] corresponds to the front depth of field, and the focus position at −5 [μm] from 1020 [μm] corresponds to the rear depth of field. That is, in the example in FIG. 12, a range within which the focus position is greater than or equal to 1015 [μm] and less than or equal to 1025 [μm] is the depth of field threshold value.

Figure 13:
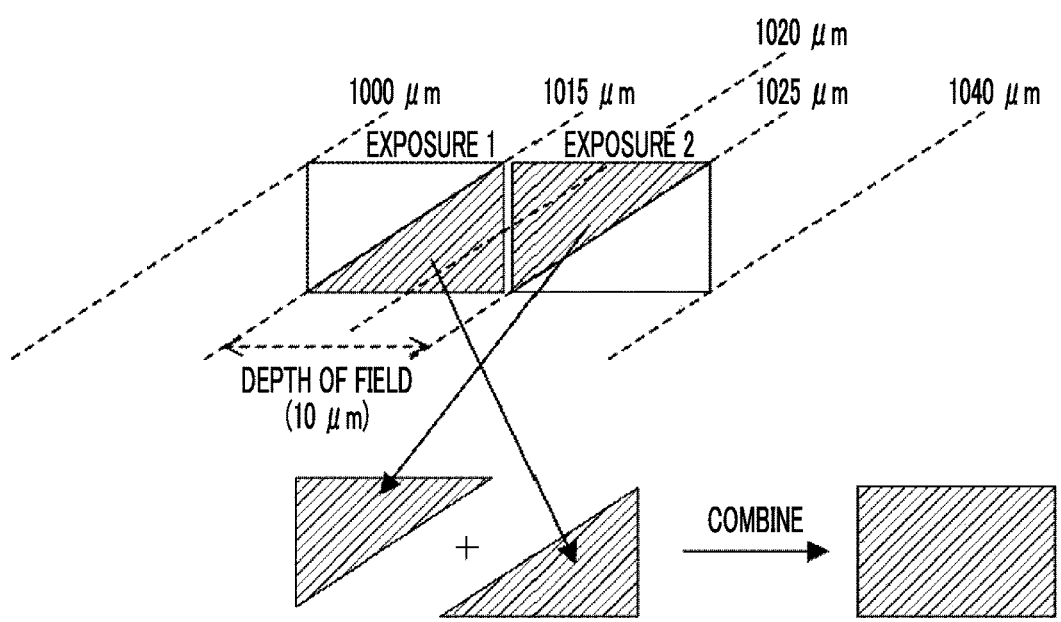
FIG. 13 is a diagram for describing the combining range of the images according to the first embodiment.
Figure 14:
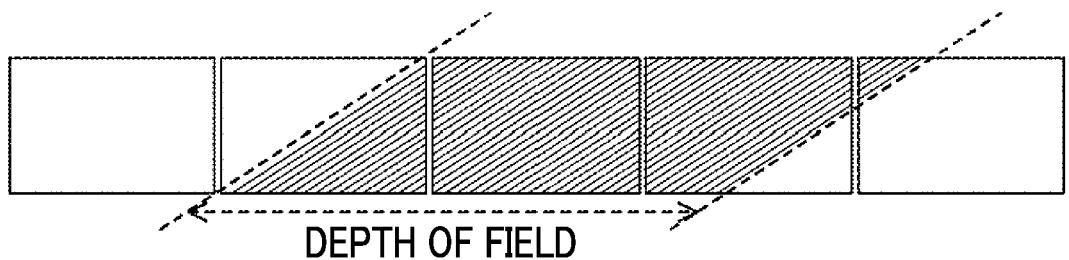
FIG. 14 is a diagram for describing the combining range of the images according to the first embodiment.

Accordingly, in this case, as illustrated in FIG. 13 as an example, a part of two images that is read out in a state where the focus position is greater than or equal to 1015 [μm] and less than or equal to 1025 [μm] is decided as the combining range of the images. The part of two images which is read out in a state where the focus position is greater than or equal to 1015 [μm] and less than or equal to 1025 [μm] is combined into one image. In FIG. 13, a hatched part illustrates the combining range of the images. In addition, illustration of the combining range of the images by the hatched part applies to FIG. 14 to FIG. 16, FIG. 19, FIG. 20, FIG. 22, and FIG. 24 described later. While an example of combining two images is illustrated in FIG. 13, the technology of the present disclosure is not limited thereto. As illustrated in FIG. 14 as an example, in a case where pixels within the depth of field threshold value are included in three or more images like a case where a depth of field is greater than the example illustrated in FIG. 13, the three or more images may be combined. In this case, for pixels overlapping among a plurality of images, an arithmetic mean of pixel values of the pixels corresponding in position may be calculated, or pixel values of any image may be employed.

Figure 15:
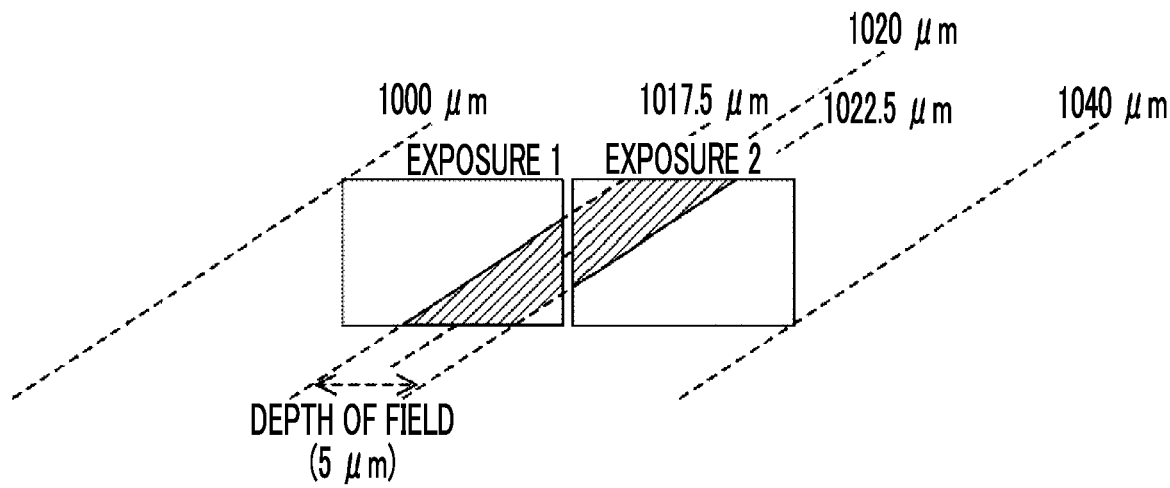
FIG. 15 is a diagram for describing the combining range of the images according to the first embodiment.

Meanwhile, as illustrated in FIG. 15 as an example, in a case where the pixels within the depth of field threshold value are not sufficient as one image like a case where the depth of field is less than the example illustrated in FIG. 13, a form of combining for the pixels within the depth of field threshold value and calculating an arithmetic mean for pixels outside the depth of field threshold value is illustrated. In this case, pixel values of any image may be employed for the pixels outside the depth of field threshold value.

Figure 16:
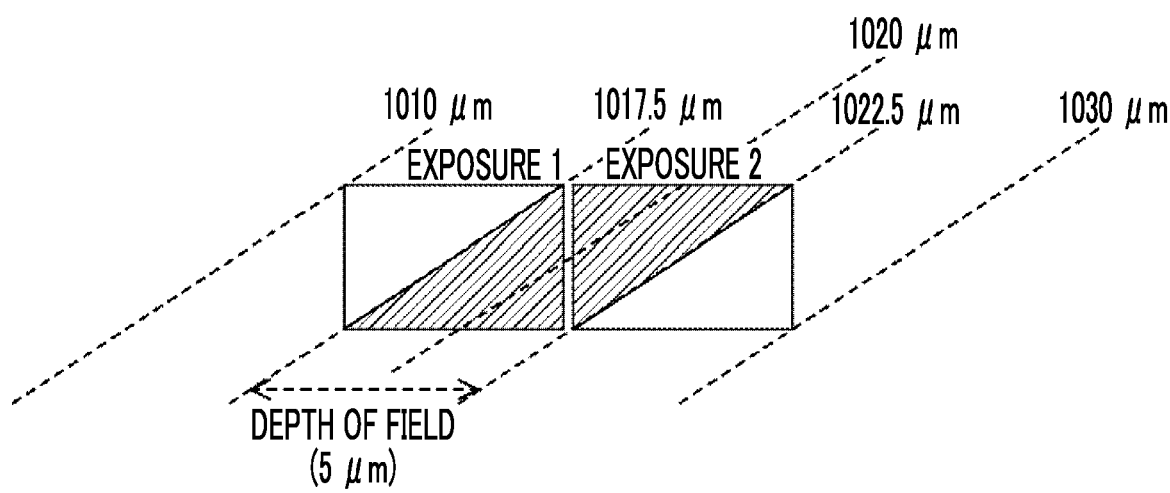
FIG. 16 is a diagram for describing a control of a focus driving speed according to a modification example.

In addition, in this case, the imaging control portion 100 may control the focus driving speed in accordance with the rolling shift amount 98 and the depth of field. Specifically, as illustrated in FIG. 16 as an example, a form in which the imaging control portion 100 controls the focus driving speed such that pixels of at least one image are included within the depth of field threshold value is illustrated. In this case, for example, the imaging control portion 100 decreases the focus driving speed as the depth of field is decreased, that is, as a range of the depth of field threshold value is decreased.

The output circuit 94D outputs the image data after combining obtained by the combining processing performed by the combining processing portion 114 to the CPU 52.

Next, actions of parts of the imaging apparatus 10 according to the embodiments of the technology of the present disclosure will be described.

In a case where an instruction to start capturing the motion picture image is received by the operation portion 54, the CPU 52 executes the imaging processing in accordance with the imaging program 60A. Hereinafter, the imaging processing executed by the CPU 52 will be described with reference to FIG. 17.

Figure 17:
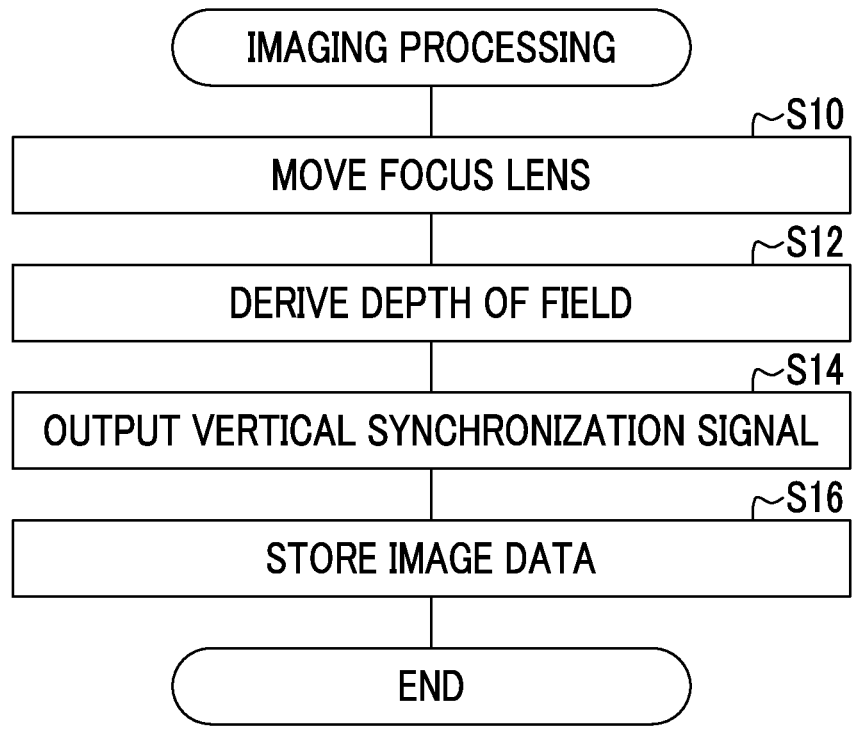
FIG. 17 is a flowchart illustrating an example of a flow of imaging processing according to the first embodiment.

In step S10 in FIG. 17, the imaging control portion 100 starts processing of moving the focus lens 16 at the predetermined focus driving speed along the optical axis L1 to the focal position obtained using the image plane phase difference AF method by driving the motor 50. That is, the combining processing in FIG. 18 that is started by processing of step S14 described later is executed in a state where the focus lens 16 is moving.

In step S12, as described above, the imaging control portion 100 derives the front depth of field and the rear depth of field in accordance with Expression (1) and Expression (2) using the permissible circle of confusion, the F number, the subject distance, and the focal length.

In step S14, the imaging control portion 100 instructs the imaging element 20 to perform the imaging for the motion picture image by outputting the vertical synchronization signal to the imaging element 20. At this point, as described above, the imaging control portion 100 outputs the focus position and the focus driving speed, and the front depth of field and the rear depth of field derived by processing of step S12 to the imaging element 20. In a case where the vertical synchronization signal is input into the imaging element 20 by processing of step S14, the combining processing illustrated in FIG. 18 is executed by the imaging element 20.

Figure 18:
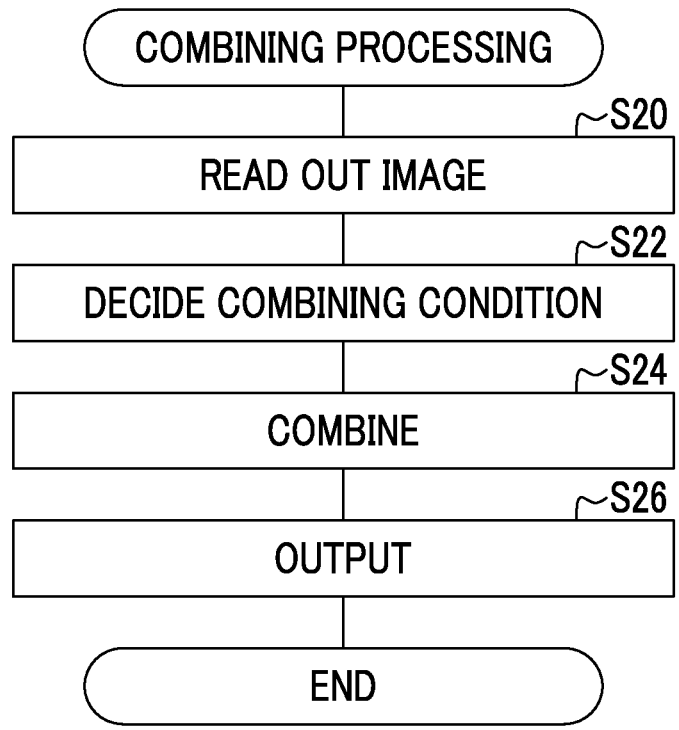
FIG. 18 is a flowchart illustrating an example of a flow of combining processing according to each embodiment.

In step S16, the storage control portion 102 performs a control for storing, in the secondary storage portion 60, the image data that is output by the output circuit 94D of the imaging element 20 by processing of step S26 of the combining processing illustrated in FIG. 18. In a case where processing of step S16 is finished, the imaging processing is finished. Motion picture image data of the second frame rate is stored in the secondary storage portion 60 by repeatedly executing processing of step S10 to step S16 at time intervals defined by the second frame rate.

In step S20 in FIG. 18, as described above, the photoelectric conversion element drive circuit 94A reads out the image data of the plurality of frames in parallel within the output period of the image data of one frame defined by the second frame rate. The AD conversion circuit 94B digitizes the captured image data read out by the photoelectric conversion element drive circuit 94A and stores the digitized captured image data in the memory 96.

In step S22, the first acquisition portion 110 acquires the focus position, the focus driving speed, the front depth of field, and the rear depth of field input from the CPU 52 of the imaging apparatus main body 12 by processing of step S14 of the imaging processing. In addition, the second acquisition portion 112 acquires the rolling shift amount 98 from the storage circuit 94E inside the imaging element 20. The combining processing portion 114 acquires the focus position, the focus driving speed, the front depth of field, and the rear depth of field from the first acquisition portion 110. In addition, the combining processing portion 114 acquires the rolling shift amount 98 from the second acquisition portion 112. The combining processing portion 114 decides the combining condition for the plurality of pieces of captured image data stored in the memory 96 by processing of step S20, using the focus position, the focus driving speed, the front depth of field, and the rear depth of field acquired from the first acquisition portion 110 and the rolling shift amount 98 acquired from the second acquisition portion 112.

In step S24, as described above, the combining processing portion 114 performs the combining processing on the plurality of pieces of captured image data in accordance with the combining condition decided by processing of step S22. In step S26, the output circuit 94D outputs the image data after combining obtained by processing of step S24 to the CPU 52. In a case where processing of step S26 is finished, the combining processing is finished.

As described above, according to the present embodiment, the combining condition for the image data of the plurality of frames stored in the memory 96 is decided from the focus driving speed and the rolling shift amount, and the combining processing is performed on the image data in accordance with the decided combining condition. Accordingly, a decrease in image quality caused in a case of performing imaging during focus driving using the rolling shutter method can be suppressed.

Figure 19:
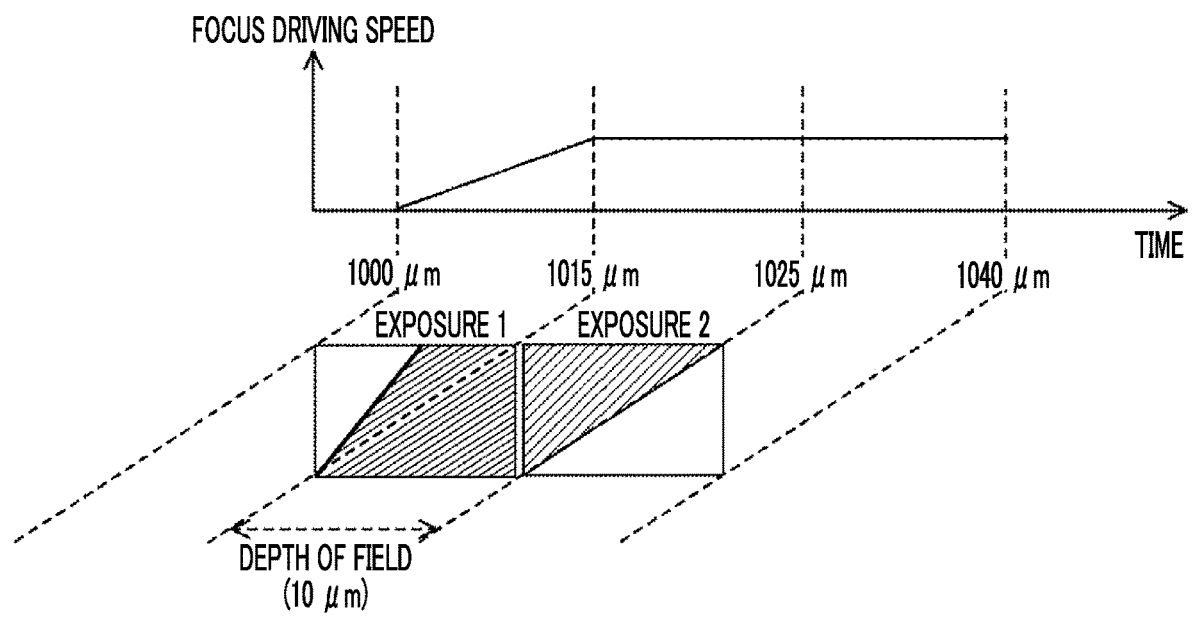
FIG. 19 is a diagram for describing a combining range of images according to the modification example.

While a case where the focus driving speed is an equal speed is described in the first embodiment, the technology of the present disclosure is not limited thereto. As illustrated in FIG. 19 as an example, the focus driving speed may be gradually increased at a timing at which driving of the focus lens 16 is started. Similarly, the focus driving speed may be gradually decreased at a timing at which driving of the focus lens 16 is finished. In these cases, as illustrated in FIG. 19, the combining processing portion 114 may decide the combining range of the images in accordance with an amount of change in focus driving speed. Specifically, a form of increasing the combining range of the images compared to a case of a target speed in a case where the focus driving speed is gradually increased toward the target speed is illustrated. Similarly, a form of increasing the combining range of the images compared to a case of the target speed in a case where the focus driving speed is gradually decreased toward the target speed is illustrated.

In addition, while an imaging element in which the photoelectric conversion element 92, the processing circuit 94, and the memory 96 are formed in one chip is illustrated as the imaging element 20 in the first embodiment, the technology of the present disclosure is not limited thereto. For example, at least the photoelectric conversion element 92 and the memory 96 among the photoelectric conversion element 92, the processing circuit 94, and the memory 96 may be formed in one chip.

Second Embodiment

A second embodiment of the technology of the present disclosure will be described. A configuration of the imaging apparatus 10 is the same as the first embodiment (refer to FIG. 1 to FIG. 5) and thus, will not be described.

A functional configuration of the CPU 52 of the imaging apparatus main body 12 according to the present embodiment will be described with reference to FIG. 9. Here, only functions different from the first embodiment will be described.

The imaging control portion 100 executes predictive auto focus at a timing of generating the vertical synchronization signal corresponding to each frame. The predictive auto focus refers to auto focus in which the focal position is predicted by performing the auto focus (in the present embodiment, image plane phase difference AF). The imaging control portion 100 further outputs the focal position (hereinafter, referred to as the "predicted focal position") obtained by the predictive auto focus to the imaging element 20.

A functional configuration of the image processing circuit 94C of the imaging element 20 according to the present embodiment will be described with reference to FIG. 10. Here, only functions different from the first embodiment will be described.

The first acquisition portion 110 further acquires the predicted focal position input from the CPU 52 of the imaging apparatus main body 12.

Figure 20:
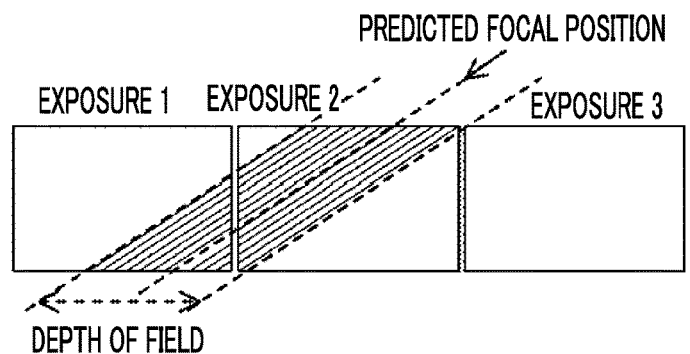
FIG. 20 is a diagram for describing a combining range of images according to a second embodiment.

As illustrated in FIG. 20 as an example, the combining processing portion 114 sets the depth of field threshold value as a range of which an upper limit and a lower limit are defined by the front depth of field and the rear depth of field based on the predicted focal position acquired by the first acquisition portion 110.

Next, actions of parts of the imaging apparatus 10 according to the embodiments of the technology of the present disclosure will be described with reference to FIG. 18 and FIG. 21. Here, only parts different from the first embodiment will be described. In addition, steps in which the same processing as FIG. 17 is executed will be designated by the same reference signs in FIG. 21 and will not be described.

Figure 21:
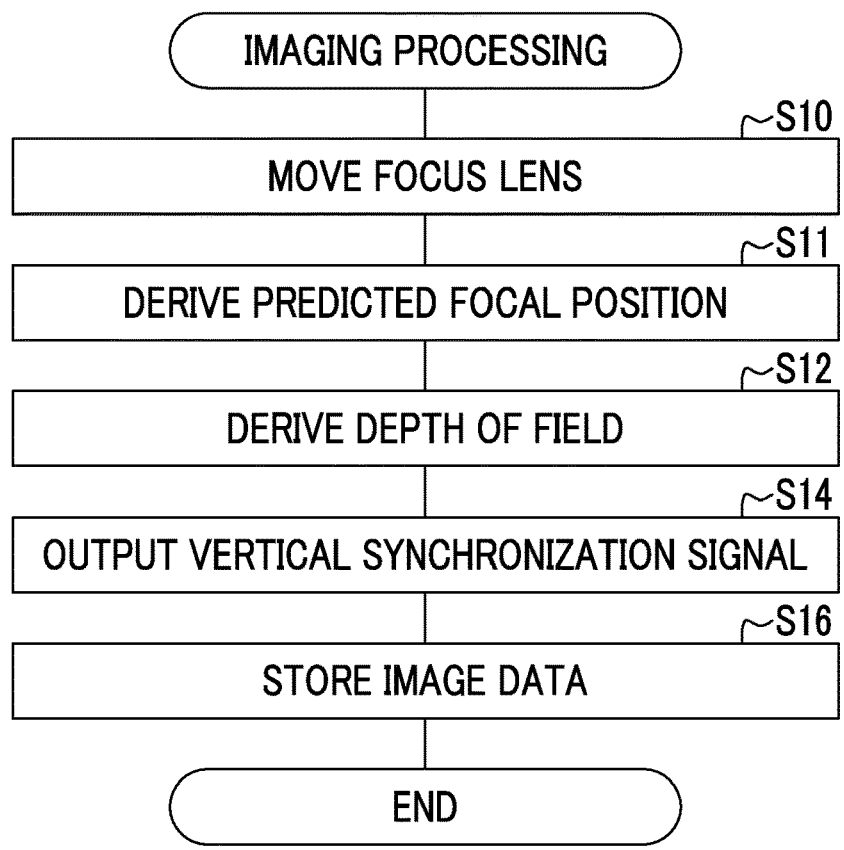
FIG. 21 is a flowchart illustrating an example of a flow of imaging processing according to the second embodiment.

In a case where processing of step S10 in FIG. 21 is finished, processing transitions to step S11. In step S11, as described above, the imaging control portion 100 derives the predicted focal position by the predictive auto focus. In step S14, the predicted focal position derived in step S11 is further input into the imaging element 20.

In step S24 in FIG. 18, as described above, the combining processing portion 114 sets the depth of field threshold value as the range of which the upper limit and the lower limit are defined by the front depth of field and the rear depth of field based on the predicted focal position acquired by the first acquisition portion 110.

As described above, according to the present embodiment, the combining range of the images for the combining processing is decided based on the focal position predicted by the predictive auto focus. Accordingly, a decrease in image quality caused in a case of performing imaging during focus driving using the rolling shutter method can be further suppressed.

Third Embodiment

A third embodiment of the technology of the present disclosure will be described. A configuration of the imaging apparatus 10 is the same as the first embodiment (refer to FIG. 1 to FIG. 5) and thus, will not be described.

A functional configuration of the CPU 52 of the imaging apparatus main body 12 according to the present embodiment will be described with reference to FIG. 9. Here, only functions different from the first embodiment will be described.

The imaging control portion 100 performs flicker detection processing using an image group that is obtained by imaging performed by the imaging element 20 in accordance with a predetermined frame rate (for example, the second frame rate) during a period determined as a period in which a flicker can be detected. In a case where the flicker is detected, the imaging control portion 100 derives a timing (hereinafter, referred to as a "flicker effect avoidance timing") at which an effect of the flicker is avoided, based on a cycle of the flicker. In the present embodiment, the imaging control portion 100 derives a timing at which brightness of the image group reaches a peak, as the flicker effect avoidance timing. The flicker effect avoidance timing may not necessarily be the timing at which the brightness of the images reaches the peak. In this case, for example, the flicker effect avoidance timing may be a timing away from the peak of the brightness of the images within a range in which the flicker does not appear in the images.

In addition, in a case of outputting the vertical synchronization signal corresponding to each frame, the imaging control portion 100 further outputs the derived flicker effect avoidance timing to the imaging element 20.

A functional configuration of the image processing circuit 94C of the imaging element 20 according to the present embodiment will be described with reference to FIG. 10. Here, only functions different from the first embodiment will be described.

The first acquisition portion 110 further acquires the flicker effect avoidance timing input from the CPU 52 of the imaging apparatus main body 12.

Figure 22:
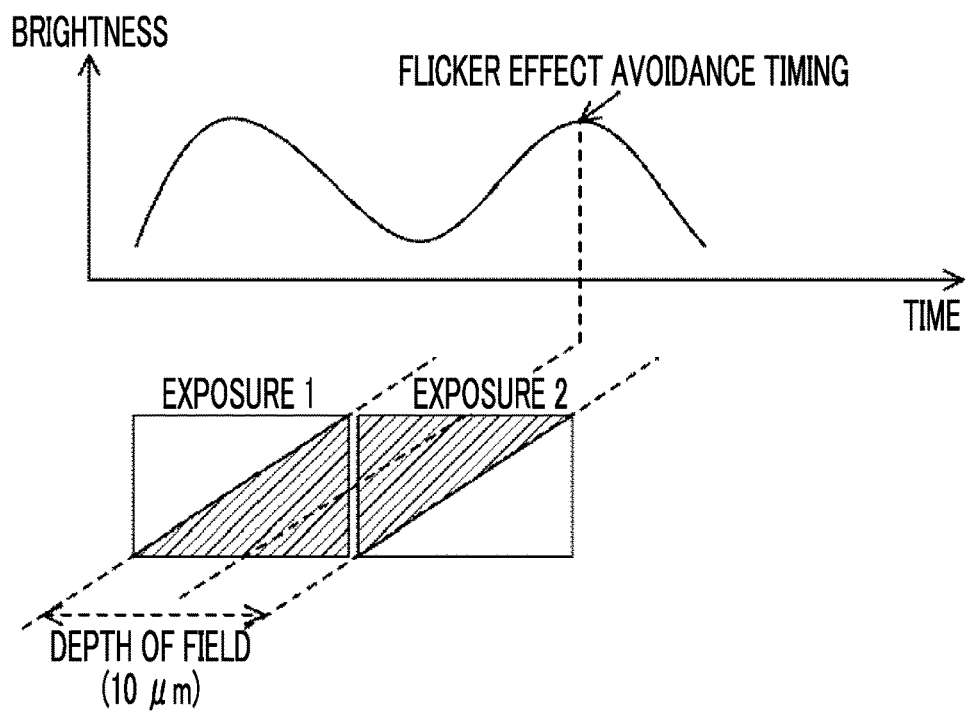
FIG. 22 is a diagram for describing a combining range of images according to a third embodiment.

As illustrated in FIG. 22 as an example, the combining processing portion 114 sets the depth of field threshold value as a range of which an upper limit and a lower limit are defined by the front depth of field and the rear depth of field based on the flicker effect avoidance timing acquired by the first acquisition portion 110.

Next, actions of parts of the imaging apparatus 10 according to the embodiments of the technology of the present disclosure will be described with reference to FIG. 18 and FIG. 23. Here, only parts different from the first embodiment will be described. In addition, steps in which the same processing as FIG. 17 is executed will be designated by the same reference signs in FIG. 23 and will not be described.

Figure 23:
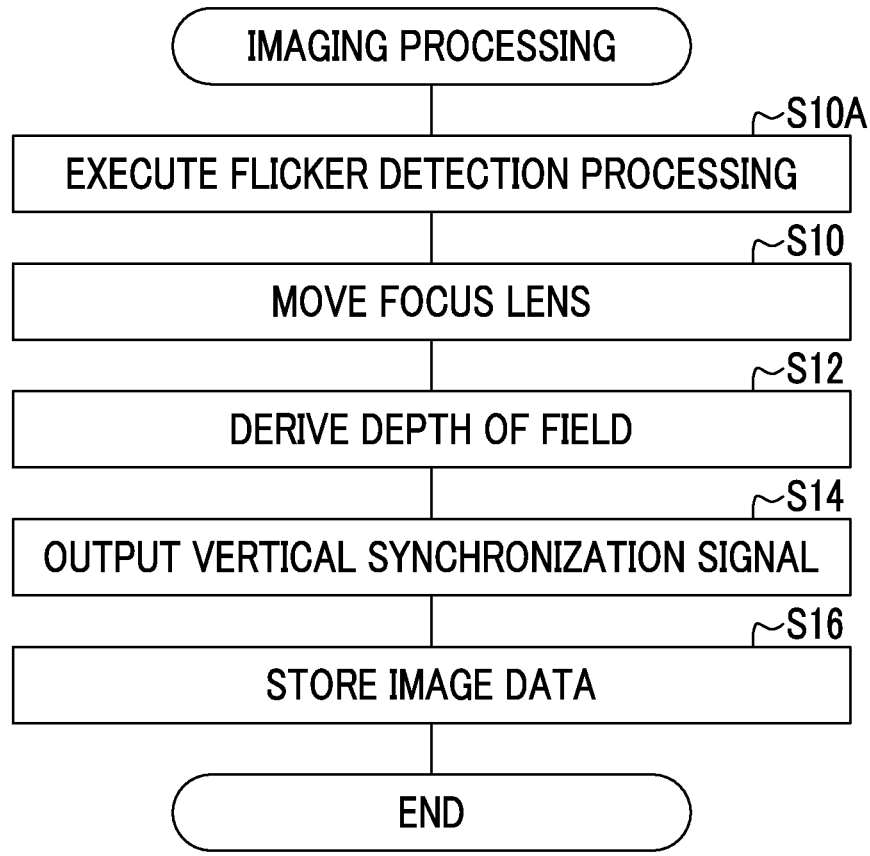
FIG. 23 is a flowchart illustrating an example of a flow of imaging processing according to the third embodiment.

In step S10A in FIG. 23, as described above, the imaging control portion 100 performs the flicker detection processing. In a case where the flicker is not detected in step S10A, processing of steps S12 to S16 and the combining processing illustrated in FIG. 18 are executed in the same manner as the first embodiment.

Meanwhile, in a case where the flicker is detected in step S10A, the flicker effect avoidance timing derived in step S10A is further input into the imaging element 20 in step S14. In this case, in step S24 in FIG. 18, as described above, the combining processing portion 114 sets the depth of field threshold value as the range of which the upper limit and the lower limit are defined by the front depth of field and the rear depth of field based on the flicker effect avoidance timing.

As described above, according to the present embodiment, the combining range of the images for the combining processing centered at the flicker effect avoidance timing is decided. Accordingly, a decrease in image quality caused in a case of performing imaging during focus driving using the rolling shutter method can be further suppressed.

Figure 24:
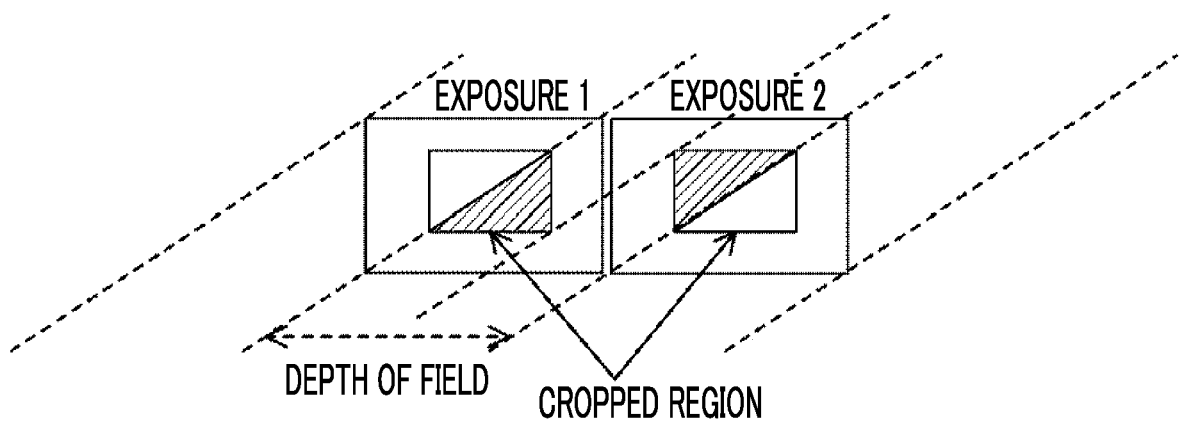
FIG. 24 is a diagram for describing a combining range of images according to the modification example.

While a case where the entire image is a target range of the combining processing is described in each of the embodiments, the technology of the present disclosure is not limited thereto. As illustrated in FIG. 24 as an example, in a case where a part of the image is cropped, a cropped region may be the target range of the combining processing.

In addition, while a case of applying the technology of the present disclosure to the motion picture image is described in each of the embodiments, the technology of the present disclosure is not limited thereto. For example, a form of applying the technology of the present disclosure to a plurality of still picture images obtained by consecutive imaging may be available.

In addition, while a case of storing the motion picture image obtained by the combining processing in the storage portion is described in each of the embodiments, the technology of the present disclosure is not limited thereto. For example, a form of displaying the motion picture image obtained by the combining processing on the first display 40 as the live view image may be available.

In addition, while the processing circuit 94 implemented by an ASIC is illustrated in each of the embodiments, the combining processing may be implemented by a software configuration using a computer.

Figure 25:
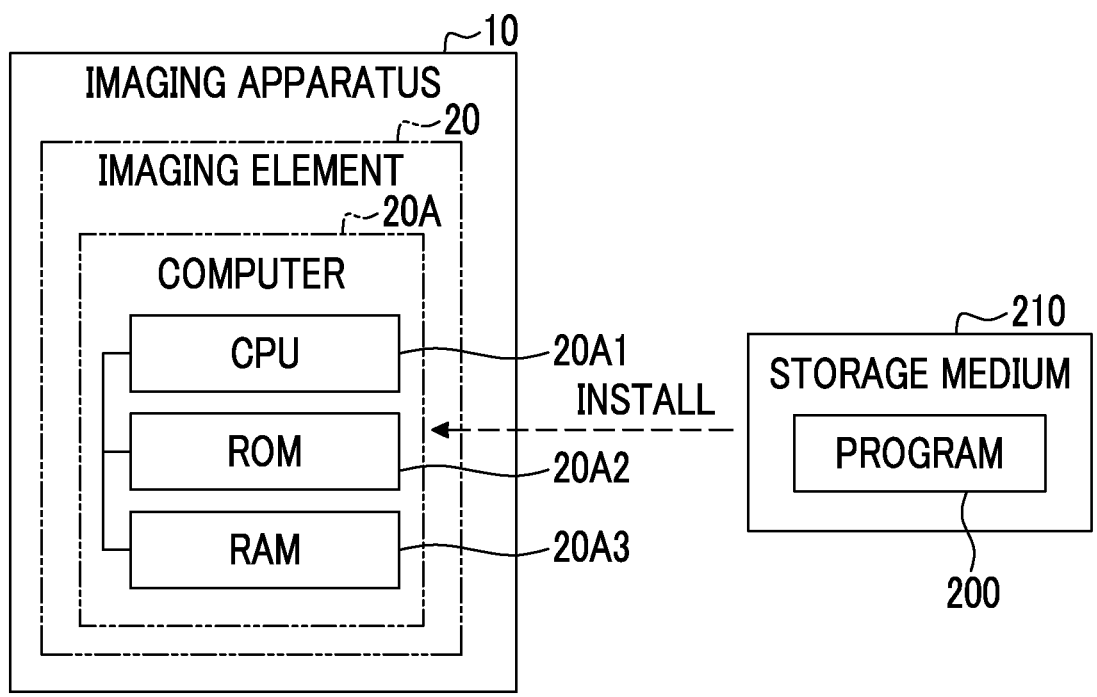
FIG. 25 is a conceptual diagram illustrating an example of an aspect of installing a program on the imaging element according to each embodiment from a storage medium storing the program.

In this case, for example, as illustrated in FIG. 25, a program 200 causing a computer 20A incorporated in the imaging element 20 to execute the combining processing (refer to FIG. 18) is stored in a storage medium 210. The computer 20A comprises a CPU 20A1, a ROM 20A2, and a RAM 20A3. The program 200 of the storage medium 210 is installed on the computer 20A, and the CPU 20A1 of the computer 20A executes the combining processing in accordance with the program 200. A single CPU is illustrated as the CPU 20A1. However, the technology of the present disclosure is not limited thereto, and a plurality of CPUs may be employed instead of the CPU 20A1. The CPU 20A1 is a hardware processor and is an example of a first processor.

Any portable storage medium such as a solid state drive (SSD) or a universal serial bus (USB) memory is illustrated as an example of the storage medium 210.

In addition, the program 200 may be stored in a storage portion of another computer or the like connected to the computer 20A through a communication network, and the program 200 may be downloaded in response to a request from the imaging apparatus 10 or the like. In this case, the downloaded program 200 is executed by the computer 20A.

In addition, the computer 20A may be disposed on the outside of imaging element 20. In this case, the computer 20A may control the processing circuit 94 in accordance with the program 200.

Various processors illustrated below can be used as a hardware resource for executing various types of processing described in each of the embodiments. Here, the imaging processing and the combining processing are illustrated as the various types of processing described in each of the embodiments. For example, as described above, a CPU that is a general-purpose processor functioning as the hardware resource for executing the various types of processing according to the embodiments of the technology of the present disclosure by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor.

The hardware resource for executing the various types of processing according to the embodiments of the technology of the present disclosure may be configured with one of those various processors or may be configured with a combination of two or more processors of the same type or different types (for example, a combination of a plurality of FPGAs or a combination of a CPU and an FPGA). In addition, the hardware resource for executing various types of processing according to the embodiments of the technology of the present disclosure may be one processor.

As an example of a configuration with one processor, first, as represented by a computer such as a client and a server, a form in which one processor is configured with a combination of one or more CPUs and software, and in which this processor functions as the hardware resource for executing the various types of processing according to the embodiments of the technology of the present disclosure is available. Second, as represented by a system-on-a-chip (SoC) or the like, a form of using a processor that implements, by one IC chip, a function of the entire system including a plurality of hardware resources for executing the various types of processing according to the embodiments of the technology of the present disclosure is available. The various types of processing according to the embodiments of the technology of the present disclosure are implemented using one or more of the various processors as the hardware resource.

Furthermore, as a hardware structure of those various processors, more specifically, an electric circuit in which circuit elements such as semiconductor elements are combined can be used.

Figure 26:
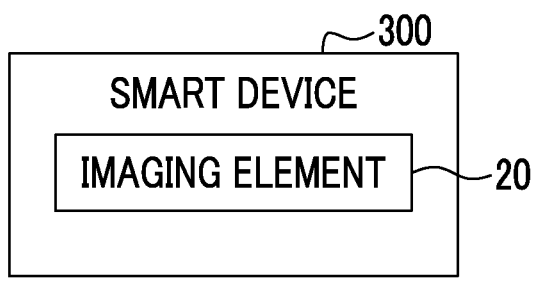
FIG. 26 is a block diagram illustrating an example of a schematic configuration of a smart device incorporating the imaging element according to each embodiment.

While an interchangeable lens camera is illustrated as the imaging apparatus 10 in each of the embodiments, the technology of the present disclosure is not limited thereto. For example, the technology of the present disclosure may be applied to a smart device 300 illustrated in FIG. 26. The smart device 300 illustrated in FIG. 26 as an example is an example of the imaging apparatus according to the embodiments of the technology of the present disclosure. The imaging element 20 described in each of the embodiments is mounted in the smart device 300. Even with the smart device 300 configured in such a manner, the same actions and effects as the imaging apparatus 10 described in each of the embodiments are obtained. The technology of the present disclosure can be applied to not only the smart device 300 but also a personal computer (PC) or a wearable terminal apparatus.

While the first display 40 and the second display 80 are illustrated as a display apparatus in each of the embodiments, the technology of the present disclosure is not limited thereto. For example, a separate display that is retrofit into the imaging apparatus main body 12 may be used as the display apparatus.

In addition, the imaging processing and the combining processing described in each of the embodiments are merely an example. Accordingly, unnecessary steps may be deleted, new steps may be added, or a processing order may be rearranged without departing from a gist of the present disclosure.

All documents, patent applications, and technical standards disclosed in the present specification are incorporated in the present specification by reference to the same extent as in a case where each of the documents, patent applications, technical standards is specifically and individually indicated to be incorporated by reference.

The present application claims the benefit of priority of Japanese Patent Application No. 2018-245749 filed on Dec. 27, 2018, the entire content of which is incorporated in the present specification by reference.

What is claimed is:

1. An imaging element comprising:
a memory that is incorporated in the imaging element; and
a first processor that is incorporated in the imaging element,
wherein the first processor is configured to
read out image data obtained by imaging a subject at a first frame rate,
process the image data, and
output the processed image data at a second frame rate,
the memory stores the image data which is read out,
the first frame rate is a frame rate higher than the second frame rate, and
the first processor is configured to
read out the image data of a plurality of frames in parallel within an output period of the image data of one frame defined by the second frame rate,
acquire a focus driving speed and a rolling shift amount, decide a combining condition for the image data of the plurality of frames stored in the memory based on the acquired focus driving speed and the rolling shift amount, and perform combining processing on the image data of the plurality of frames in accordance with the decided combining condition, and
output the image data after combining obtained by the combining processing.

2. The imaging element according to claim 1, wherein the first processor is configured to decide, as the combining condition, a range of an image within a predetermined depth of field threshold value as a combining range of images for the combining processing.

3. The imaging element according to claim 2, wherein the first processor is configured to perform the combining processing using a part, out of the image data of the plurality of frames stored in the memory, that is read out in a state where a focus position is within the depth of field threshold value.

4. The imaging element according to claim 3, wherein the first processor is configured to, in a case where the part read out in a state where the focus position is within the depth of field threshold value overlaps in the image data of the plurality of frames stored in the memory, perform the combining processing by calculating an arithmetic mean of pixel values of pixels corresponding in position or by using pixel values of any image for the overlapping part.

5. The imaging element according to claim 1, wherein the first processor is configured to decide, as the combining condition, a combining range of images for the combining processing based on a focal position that is predicted by predictive auto focus in which the focal position is predicted by auto focus.

6. The imaging element according to claim 1, wherein in a case where a flicker is detected, the first processor is configured to decide, as the combining condition, a combining range of images for the combining processing based on a timing at which an effect of the flicker is avoided.

7. The imaging element according to claim 1, wherein the first processor is configured to, in a case where the image data is read out from a plurality of photosensors arranged in a matrix form, set the number of divided exposure periods within the output period of the image data of one frame defined by the second frame rate to a value corresponding to the number of lines on which AD conversion is performed at the same time.

8. The imaging element according to claim 7, wherein the first processor is configured to set the number of divided exposure periods to a value less than or equal to the number of lines on which the AD conversion is performed at the same time.

9. The imaging element according to claim 1, wherein the first processor is configured to, in a case where an image indicated by the image data is cropped, set a cropped region as a target range of the combining processing.

10. The imaging element according to claim 1, wherein at least a photoelectric conversion element and the memory are formed in one chip.

11. The imaging element according to claim 10, wherein the imaging element is a laminated imaging element in which the photoelectric conversion element is laminated with the memory.

12. An imaging apparatus comprising:
the imaging element according to claim 1; and
a second processor configured to perform a control for storing the image data output by the first processor included in the imaging element in a storage medium.

13. The imaging apparatus according to claim 12,
wherein the second processor is further configured to control the focus driving speed in accordance with the rolling shift amount and a depth of field.

14. An image data processing method of an imaging element incorporating a first processor configured to read out image data obtained by imaging a subject at a first frame rate, process the image data, and output the processed image data at a second frame rate, and a memory that stores the image data read out by the first processor, the image data processing method comprising:
  setting the first frame rate to a frame rate higher than the second frame rate; and
  by the first processor,
  reading out the image data of a plurality of frames in parallel within an output period of the image data of one frame defined by the second frame rate;
  acquiring a focus driving speed and a rolling shift amount, deciding a combining condition for the image data of the plurality of frames stored in the memory based on the acquired focus driving speed and the rolling shift amount, and performing combining processing on the image data of the plurality of frames in accordance with the decided combining condition; and
  outputting the image data after combining obtained by the combining processing.

15. A non-transitory recording medium that records a program causing a computer to execute an image data process in an imaging element that reads out image data obtained by imaging a subject at a first frame rate, stores the image data which is read out in a memory, processes the image data, and outputs the processed image data at a second frame rate,
  the first frame rate being a frame rate higher than the second frame rate,
  the image data process comprising:
    reading out the image data of a plurality of frames in parallel within an output period of the image data of one frame defined by the second frame rate;
    acquiring a focus driving speed and a rolling shift amount, deciding a combining condition for the image data of the plurality of frames stored in the memory based on the acquired focus driving speed and the rolling shift amount, and performing combining processing on the image data of the plurality of frames in accordance with the decided combining condition; and
    outputting the image data after combining obtained by the combining processing.

* * * * *